United States Patent [19]
Hikosaka et al.

[11] Patent Number: 5,792,564
[45] Date of Patent: Aug. 11, 1998

[54] PERPENDICULAR RECORDING MEDIUM AND MAGNETIC RECORDING APPARATUS

[75] Inventors: Takashi Hikosaka, Tokyo; Yoichiro Tanaka; Junichi Akiyama, both of Kawasaki, all of Japan

[73] Assignee: Kabushiki Kaisha Toshiba, Kawasaki, Japan

[21] Appl. No.: 470,463

[22] Filed: Jun. 6, 1995

Related U.S. Application Data

[63] Continuation of Ser. No. 208,409, Mar. 10, 1994.

[30] Foreign Application Priority Data

Mar. 10, 1993 [JP] Japan ........................ 5-049051
Sep. 10, 1993 [JP] Japan ........................ 5-225286
Dec. 28, 1993 [JP] Japan ........................ 5-354952

[51] Int. Cl.$^6$ ........................................... G11B 5/66
[52] U.S. Cl. .......................... 428/610; 428/611; 428/621; 428/632; 428/692; 428/694 R; 428/694 T; 428/694 TS; 428/698; 428/702; 428/704; 428/900; 360/113; 204/192.2
[58] Field of Search ................ 428/694 R, 694 T, 428/694 TS, 610, 611, 621, 632, 692, 698, 702, 704, 900; 204/192.2; 360/113

[56] References Cited

U.S. PATENT DOCUMENTS

| | | | |
|---|---|---|---|
| 4,542,062 | 9/1985 | Takada | 428/336 |
| 4,717,584 | 1/1988 | Aoki | 427/573 |
| 4,745,505 | 5/1988 | Peeters | 360/120 |
| 4,749,628 | 6/1988 | Ahlert | 428/660 |
| 4,883,711 | 11/1989 | Shiroishi | 428/336 |
| 5,068,144 | 11/1991 | Kitakami | 428/323 |
| 5,068,158 | 11/1991 | Futamoto | 428/694 TS |
| 5,143,794 | 9/1992 | Suzuki | 428/611 |
| 5,236,791 | 8/1993 | Yahisa | 428/694 TP |

FOREIGN PATENT DOCUMENTS 6-44549  2/1994  Japan.

*Primary Examiner*—Leszek Kiliman
*Attorney, Agent, or Firm*—Oblon, Spivak, McClelland, Maier & Neustadt, P.C.

[57] ABSTRACT

A longitudinal recording medium and a magnetic recording apparatus containing the same, comprising a substrate and a longitudinal magnetization film formed on the substrate containing grains of a Co-based alloy, and exhibiting an oxygen concentration distribution having two peaks as follows: a peak of higher oxygen concentration pertaining to grain boundaries of the longitudinal magnetization film, and a peak of lower oxygen concentration pertaining to grain interiors of the longitudinal magnetization film.

12 Claims, 15 Drawing Sheets

PERPENDICULAR RECORDING MEDIUM AND MAGNETIC RECORDING APPARATUS

This is a Continuation of application Ser. No. 08/208,409 filed on Mar. 10, 1994, pending.

BACKGROUND OF THE INVENTION

1. Field of the Invention

The present invention relates to a perpendicular recording medium and a magnetic recording apparatus incorporating the perpendicular recording medium.

2. Description of the Related Art

A magnetic thin film formed mainly of Co has a high saturation flux density and a prominent magnetocrystalline anisotropy, thus the film is now used for magnetic recording media more and more widely. In particular, by utilizing a great anisotropy energy that the magnetic thin film has, attempts are made to use the film in manufacturing perpendicular recording media suitable for ultra-high density recording. The results of research conducted in recent years reveal that, in order to improve coercivity and media S/N ratio, Co-based perpendicular magnetization film needs to be formed into such a structure that magnetic interactions between Co-based grains are separated.

Further, it is known that a double-layer medium, which comprises a soft magnetic underlayer having a high permeability and a perpendicular magnetization film, exhibits better recording-producing characteristics, due to an interaction between a head and the soft magnetic underlayer, than a single-layer medium, which comprises a perpendicular magnetization film only (See, for example, Jpn. Pat. Appln. KOKAI Publication No. 52-78403). Thus, most perpendicular recording media have a soft magnetic underlayer (back layer) under a perpendicular magnetization film.

Various Co-based perpendicular magnetization films are known. Among them are: (1) CoCr alloy film or CoCr alloy film containing an element selected from Ni, Ta and Pt, which are most popular; (2) Co—CoO film formed by vacuum deposition performed in an oxygen atmosphere See, for example, Jpn. Pat. Appln. KOKAI Publication No. 59-162622); (3) CoPt(Cr) alloy film formed by sputtering (Proceedings of Japan Applied Magnetics Society, 8pB-11, 1990); (4) CoPtBO film (Jpn. Pat. Appln. KOKAI Publication No. 3-58316); (5) multilayer film having a Co layer and a Pt layer, developed mainly for optomagnetic recording (Jpn. Pat. Appln. KOKAI Publication No. 3-80421).

The perpendicular magnetization films (1) to (5) will be described in more detail.

(1) CoCr Alloy Film

A film made of Co only has a shape anisotropy energy due to the thin film shape greater than a magnetocrystalline anisotropy energy. On the other hand, it is expected in a CoCr film in which Cr is added to Co that the shape anisotropy can be reduced and the coercivity can be increased to some degree because of segregation of Cr at the boundaries of Co grains and accordingly suppression of the magnetic interaction between Co grains. Since Cr is mixed in the Co grains, however, the magnetocrystalline anisotropy and saturation magnetization of the CoCr film are less than those of a film made of Co only. It is therefore necessary to use more Cr in order to manufacture a perpendicular magnetization film whose decrease in the shape anisotropy is more than that in the magnetocrystalline anisotropy. A CoCr film having such a high Cr content has but a saturation magnetization of about four times weaker than that of a film made of Co only.

Unlike a longitudinal recording medium, a perpendicular recording medium cannot have an increased surface magnetic flux density merely by increasing the thickness of the recording film. The perpendicular medium therefore needs to have a film with sufficient saturation magnetization to generate a large output. If a CoCr perpendicular magnetization film is formed, the medium would fail to generate a sufficient output because the CoCr film has but a low saturation magnetization as described above.

(2) Co—CoO Film

In a Co—CoO film, the Co grain density is reduced, and the magnetic interaction between the Co grains is weakened since antiferromagnetic CoO having a Neel point close to room temperature is formed at the boundaries of the Co grains. The film can therefore have a relatively large coercivity. If made thicker, the Co—CoO film will likely acquire shape anisotropy energy due to columnar grains. Furthermore, the Co—CoO film is superior to a CoCr film in terms of saturation magnetization.

Since oxygen is strongly bonded with Co, however, (002) oriented Co grains are hard to grow. Consequently, the Co—CoO film exhibits but poor crystalinity and a very low magnetocrystalline anisotropy, its crystal orientation is liable to deteriorate, and it cannot have a high coercivity.

Further, because a remarkable reduction in the magnetocrystalline anisotropy and difference in magnetocrystalline anisotropy between grains arise simultaneously, the Co—CoO film involves a prominent anisotropy dispersion. In particular, CoO has a Neel point in the vicinity of room temperature, and consequently, a bias magnetic field will be applied to the Co grains when the ambient temperature of the medium falls below room temperature. The bias magnetic field becomes locally non-uniform since the orientation of the CoO grains is not uniform. As a result, magnetic dispersion in the Co—CoO film is increased.

Moreover, since the orientation of the Co grains is deteriorated, i.e., the c-axis of Co can hardly be oriented perpendicularly to the substrate, the perpendicular anisotropy energy cannot be greater than the longitudinal anisotropy energy. The Co—CoO film cannot have properties required as a perpendicular magnetization film.

(3) CoPt(Cr) Alloy Film

A CoPt(Cr) alloy film has a high saturation magnetization. Moreover, if formed by sputtering conducted under optimal conditions, the CoPt(Cr) alloy film may have sufficient perpendicular anisotropy energy. Unlike Co-based films containing elements other than Pt, the CoPt(Cr) alloy film containing Pt up to 30 at % has greater perpendicular anisotropy energy than a film made of Co only.

The CoPt(Cr) alloy film, however, has strong magnetic interaction between the grains, and has a low perpendicular coercivity. As a result, a recording medium having this film cannot generate a sufficient output at a low band.

(4) CoPtBO Film

A CoPtBO film can be obtained by adding boron to CoPt and by forming into film in an oxygen atmosphere. This film has fairly high saturation magnetization.

The CoPtBO film, however, is liable to take fcc phase. A perpendicular anisotropy of the film is induced based on a shape anisotropy. The film should therefore be made thick. Since the CoPtBO film tends to be oxidized due to the addition of boron, its crystal orientation is liable to deteriorate as is the case of a Co—CoO film. The CoPtBO film needs to be supported by an underlayer made of, for example, Pt to preserve the crystal orientation.

A perpendicular recording medium generally has a soft magnetic underlayer under the perpendicular magnetization film as described above. If the perpendicular magnetization film is made thick or a Pt underlayer is used to control the crystal orientation, the spacing between a magnetic head and the soft magnetic underlayer will unavoidably increase, diminishing the interaction between the grains.

(5) Multilayer film having Co layer and Pt layer

A multilayer film of this type has an anisotropy energy, which can be attributed to the interface effect between the Co layer and the Pt layer. Hence, the condition of the interface between the Co layer and the Pt layer must be controlled. In other words, anything that would degrade the interface condition should not be done. Thus it is difficult to, for example, increase the deposition rate of the film. Since this film has a multilayer structure, its overall saturation magnetization is comparatively low, or as low as that of a CoCr film.

There is another problem in connection with requirement to minimize the head-to-medium spacing in order to enhance the recording density. The medium has a protective film, made of carbon or the like having a thickness of about 20 nm, for protecting the recording film from damage when a magnetic head collides with the medium. To this end, when the flying height of the head is decreased to a value less than surface roughness Rmax of the medium, the head will contact the medium more frequently. It will then become necessary to make the protective film thicker, making it impossible to reduce the head-to-medium spacing.

When recording-reproducing is performed with a double-layer perpendicular recording medium described above, there will be detected spike noise. The spike noise is not detected in a single-layer recording medium having a perpendicular magnetization film only. This noise is generated not from the interaction between the soft magnetic underlayer and the perpendicular magnetization film formed on the underlayer. Rather, it is generated exclusively in the soft magnetic underlayer. This noise is generated not uniformly in the entire medium: That is, many domain walls exist in the soft magnetic underlayer where the spike noise is generated, and no domain walls exist where no spike noise is generated (Jpn. Pat. Appln. KOKOKU Publication No. 3-53686). The spike noise is generated due to the irreversible movement of the domain walls, and is generally called "Barkhausen noise". To suppress this noise, it suffices to inhibit the generation of domain walls in the soft magnetic underlayer. However, no effective means for suppressing this problem is available.

Furthermore, in order to obtain more excellent recording-reproducing characteristics, it is important to develop a magnetic recording apparatus wherein a perpendicular recording medium and recording and reproducing heads are combined in optimal manner.

SUMMARY OF THE INVENTION

An object of the present invention is to provide a perpendicular recording medium that has a high saturation magnetization, a prominent perpendicular anisotropy and a high coercivity, and involves but a small magnetic dispersion at room temperature and low temperatures, and also to provide a perpendicular recording medium that is scarcely damaged if it collides with a magnetic head or goes into sliding contact therewith.

Another object of the invention is to provide a perpendicular recording medium in which Barkhausen noise due to the movement of the domain walls in the soft magnetic underlayer can be effectively suppressed, and with which recording and reproducing can be performed with high sensitivity at high resolution.

Still another object of the present invention is to provide a magnetic recording apparatus which has excellent recording-reproducing characteristics.

According to a first aspect of this invention, there is provided a perpendicular recording medium comprising: a substrate; and a perpendicular magnetization film formed on the substrate and having a crystal phase of a CoPt-based alloy and a compound phase of material selected from the group consisting of Co oxide, Co nitride and Co carbide.

According to a second aspect of the invention, there is provided a perpendicular recording medium comprising: a substrate; and a perpendicular magnetization film formed on the substrate, made of a Co-based alloy, and exhibiting a surface oxygen-concentration distribution having two peaks.

According to a third aspect of the present invention, there is provided a perpendicular recording medium comprising: a substrate; an underlayer formed on the substrate; and a perpendicular magnetization film formed on the underlayer, made of a Co-based alloy, and exhibiting a surface oxygen-concentration distribution having two peaks.

According to a fourth aspect of the invention, there is provided a magnetic recording apparatus comprising: a perpendicular recording medium comprising a substrate and a perpendicular magnetization film formed on the substrate and having a crystal phase of a CoPt-based alloy and a compound phase of material selected from the group consisting of Co oxide, Co nitride and Co carbide; a recording head for perpendicularly magnetizing the film, thereby recording signals on the recording medium; and a reproducing head comprising a magnetoresistance (MR) element for reading signals from the recording medium.

According to a fifth aspect of the present invention, there is provided a magnetic recording apparatus comprising: a perpendicular recording medium comprising a substrate, an underlayer formed on the substrate, and a perpendicular magnetization film formed on the substrate and having a crystal phase of a CoPt-based alloy and a compound phase of material selected from the group consisting of Co oxide, Co nitride and Co carbide; a recording head for perpendicularly magnetizing the film, thereby recording signals on the recording medium; and a reproducing head comprising an MR element for reading signals from the recording medium.

According to a sixth aspect of this invention, there is provided a magnetic recording apparatus comprising: a perpendicular recording medium comprising a substrate and a perpendicular magnetization film formed on the substrate, made of a Co-based alloy and exhibiting a surface oxygen-concentration distribution having two peaks; a recording head for perpendicularly magnetizing the film, thereby recording signals on the recording medium; and a reproducing head comprising an MR element for reading signals from the recording medium.

Another aspect of this invention provides a longitudinal recording medium and a magnetic recording apparatus containing the same comprising a substrate and a longitudinal magnetization film formed on the substrate containing grains of a Co-based alloy, and exhibiting an oxygen concentration distribution having two peaks as follows: a peak of higher oxygen concentration pertaining to grain boundaries of the longitudinal magnetization film, and a peak of lower oxygen concentration pertaining to grain interiors of the longitudinal magnetization film.

DETAILED DESCRIPTION OF THE PREFERRED EMBODIMENTS

The present invention will be described in greater detail, with reference to various embodiments.

Figure 1:
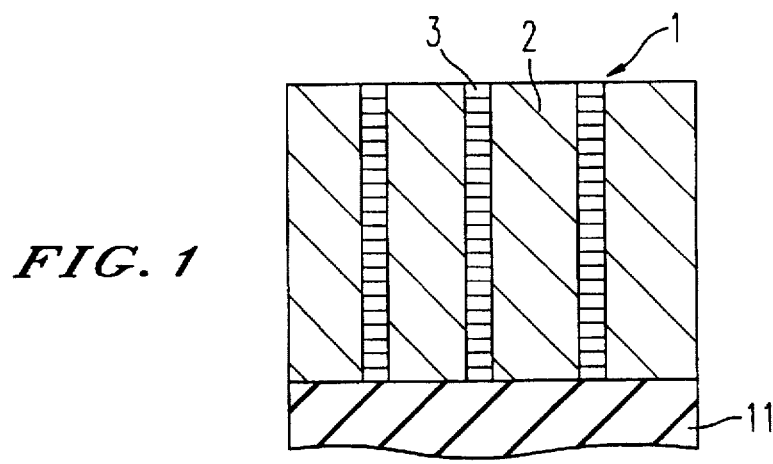
FIG. 1 is a sectional view of a perpendicular recording medium according to the present invention.

A perpendicular recording medium according to the first embodiment of the invention is characterized in that the perpendicular magnetization film comprises a crystal phase of CoPt-based alloy and a compound phase of material selected from the group consisting of Co oxide, Co nitride and Co carbide. More precisely, as shown in FIG. 1, the recording medium comprises a substrate 11 and a perpendicular magnetization film 1 formed on the substrate 11. The film 1 comprises CoPt columnar grains 2 of a hcp phase having a c-axis normal to the plane of the film and a compound phase 3 of material which has been selected from the group consisting of Co oxide, Co nitride and Co carbide.

The CoPt-based alloy may contain at least one element selected from the group consisting of Cr, Mo, W, V, Nb, Ta, Ti, Zr and Hf. If the compound phase is made of Co oxide (CoO), it is desirable that the crystal orientation be normal to the plane of the film, i.e., (111) orientation. The CoO phase may contain Pt or a third element, provided that its antiferromagnetic property is not affected by the element.

The perpendicular magnetization film shown in FIG. 1 can be formed as follows: First, a CoPt-based alloy film is formed on the substrate 11 by performing vacuum deposition or sputtering in an inert-gas atmosphere, and then the alloy film is oxidized, nitrized or carbonized.

The CoPt film has a high saturation magnetization and has a large magnetocrystalline anisotropy energy. The film containing Pt up to 30 at % becomes a perpendicular magnetization film when the CoPt grains have (002) orientation normal to the plane of the film. When the grain boundaries are oxidized, nitrized or carbonized, thereby forming the compound phase, the magnetic interaction between the CoPt grains diminished. The coercivity of the CoPt film is thereby increased. This film has extremely large perpendicular anisotropy, which is derived from the magneto-crystalline anisotropy of the film. Thus, the CoPt film can well function as a perpendicular magnetization film even if it is 100 nm or less thick.

In the case where the CoPt-based alloy contains at least one element selected from the group consisting of Cr, Mo, W, V, Nb, Ta, Ti, Zr and Hf, the grains of CoPt-based alloy can made into finer ones. As the magnetic grains become finer, their magnetization rotation will be more resembled to idealized simultaneous magnetization rotation. As a result, the coercivity of the film can increase, and medium noise can be suppressed.

In the case where the compound phase is made of CoO grains having (111) orientation normal to the film plane, the bias magnetic field applied to the CoPt grains remain uniform even if the CoO phase is rendered antiferromagnetic at low temperatures. Thus, the anisotropy dispersion thereof would not increase.

In a perpendicular recording medium according to the second embodiment of the invention, the perpendicular magnetization film is made of an Co-based alloy such as CoPt, CoNi or CoCr. The distribution of the oxygen concentration in the surface of this film has two peaks. It should be noted that the distribution has been determined in the following way. The oxygen concentration is measured for every region made by imaginarily dividing the surface of the film into squares having sides of several nanometers, by means of energy dispersive method in X-ray spectroscopy (EDX) employing an analytical electron microscope. The values obtained of all regions are plotted, preparing a oxygen-concentration distribution diagram. The perpendicular recording medium of the second embodiment of the present invention represents two peaks in the oxygen-concentration distribution diagram. The higher peak pertains to the grain boundaries, whereas the lower peak to the grains.

In this perpendicular recording medium, regions having a comparatively high oxygen concentration and corresponding to grain boundaries diminishes the magnetic interaction between the grains. This suppresses a decrease in the coercivity of the film by magnetization reversal due to the magnetic Interaction between many grains. In other words, effective use can be made of the coercivity each grain has.

This perpendicular recording film has magnetic grains showing magnetism which contain not so much oxygen as the magnetic grains of a conventional magnetic film having an oxide phase, such as a Co—CoO film. Therefore, its magnetocrystalline anisotropy, crystal orientation, and saturation flux density decrease little. On the other hand, since some amount of oxygen is added to these magnetic grains, magnetization reversal by the movement of the domain walls is prevented, and consequently, non-uniform magnetization reversal within each grain is prevented, which will produce an increased coercivity of each grain. Further, the presence of peaks in the oxygen-concentration distribution indicates that the grains have uniform magnetic property.

It is desirable that any region corresponding to grain boundaries has an oxygen concentration of 15 at % or more, and that any region corresponding to grains has an oxygen concentration of 1 to 15 at %. If the region corresponding to the grain boundaries has an oxygen concentration of less than 15 at %, the grains will fail to have their coercivity increased to a sufficient value. If the region corresponding to the grains has an oxygen concentration exceeding 15 at %, the crystal orientation will be impaired so much as to diminish the perpendicular anisotropy of the recording film. Conversely, if this region has an oxygen concentration less than 1 at %, the coercivity of the film will be decreased.

This perpendicular recording film can be formed in the following method. In brief, a Co-based target is sputtered in a sputtering atmosphere containing oxygen, thus generating two types of sputtered particles having a relatively high energy and having a relatively low energy. The two types of sputtered particles may be formed simultaneously. Alternatively or preferably, they may be formed alternately within a very short time. The two types of sputtered particles differ in readiness of bonding to oxygen. To be more specific, the low-energy sputtered particles can more readily bond to oxygen. Therefore, a film can be formed in which each region formed of low-energy sputtered particles contains much oxygen, and each region formed of high-energy sputtered particles contains little oxygen.

Various methods can be employed to form the perpendicular recording film. Among these methods are: a method of switching the pressure of a mixture of rare gas and oxygen, used as sputtering gas, repeatedly between two different values; a method of switching the sputtering power repeatedly between two values; a method of using two gun-target sets, the sputtering guns of which are supplied with different powers; a method of using two types of sputtering gases, each being a mixture of rare gas and oxygen, or one being rare gas only; a method of repeatedly changing the distance between the sputtering gun and the substrate; and a method of using two sputtering guns located at different distances from the substrate. Namely, two types of sputter particles can be generated by various methods—by changing the sputter gas pressure, the sputtering power, the type of sputtering rare gas, or the gun-substrate distance.

As described above, the perpendicular recording film whose oxygen-concentration distribution has two peaks hardly has its magnetocrystalline anisotropy and crystal orientation degraded. It is, therefore, quite suitable for use in a perpendicular recording medium.

In the present invention, use can be made of a perpendicular magnetization film which contains 1 to 15 at % of adsorbed oxygen or adsorbed nitrogen. Unlike oxygen chemically bonded to Co, the adsorbed oxygen or nitrogen does not greatly reduce the saturation magnetization of the film. In addition, the adsorbed oxygen or nitrogen generates a stress in each CoPt grain, enhancing the hardness of the film, and also inhibits movement dislocations in the grain. Thus, the plastic deformation of the film can be suppressed even if a magnetic head contacts the perpendicular magnetization film and subsequently applies a stress on the film. If the film which contains less than 1 at % of adsorbed oxygen or nitrogen, it will be insufficiently hard and will likely be damaged when a head crash takes place. On the other hand, if the film contains more than 15 at % of adsorbed oxygen or nitrogen, it will have an excessive internal compression and will likely to have cracks when a head contact occurs.

The structure of the perpendicular recording medium according to the present invention will now be described, with reference to the accompanying drawings.

The recording medium may be of the type shown in FIG. 1, which comprises a substrate 11 and a perpendicular magnetization film 1 formed on the substrate 1. The film may further comprise a protective film (not shown) which is formed on the perpendicular magnetization film 1. It may still further comprise a lubricant film formed on the protective film. In the case where the film 1 has a sufficient hardness, however, the medium needs to have neither a protective film nor a lubricant film.

Figure 2:
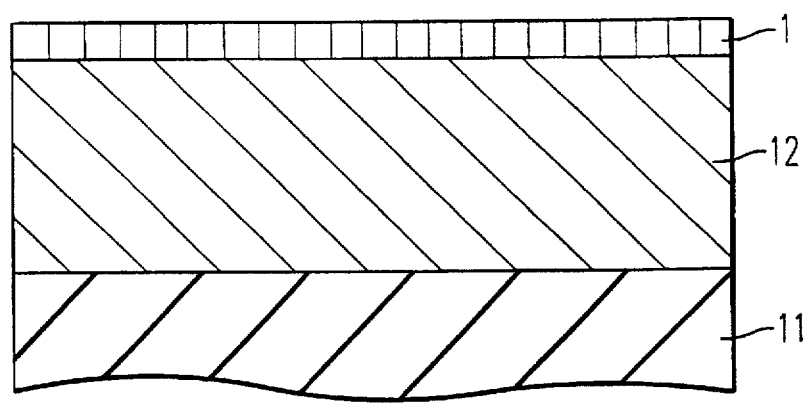
FIG 2 is a sectional view showing another type of a perpendicular recording medium according to the present invention.
Figure 3:
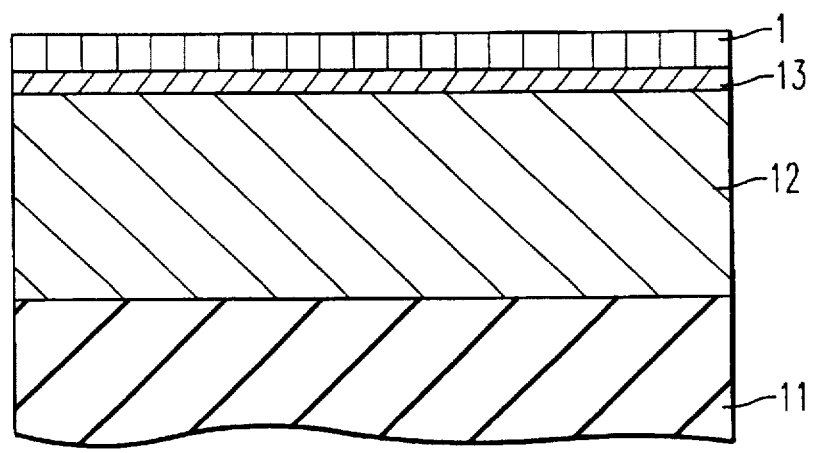
FIG. 3 is a sectional view of still another type of a perpendicular recording medium according to this invention.

The perpendicular recording medium of this invention may of the type shown in FIG. 2, which comprises a substrate 11, a soft magnetic underlayer 12 formed on the substrate 11, and a perpendicular magnetization film 1 formed on the underlayer 12. Alternatively, the medium may be of the type shown in FIG. 3, which differs from the medium of FIG. 2 in that a nonmagnetic film 13 is interposed between the soft magnetic underlayer 12 and the perpendicular magnetization film 1. To be more precise, the medium of FIG. 3 has a multilayer structure comprising the substrate 11, the soft magnetic underlayer 12, the nonmagnetic film 13, and the magnetizing film 1, which are mounted one upon another in the order mentioned. In the media of FIGS. 2 and 3, the underlayer 12 can be made of various soft magnetic materials such as CoZrNb, CoFeTa, NiFe, Fe—C, Fe—N and Fe—Si. Nonetheless, the material of the underlayer 12 is not limited to these exemplified here.

Figure 4:
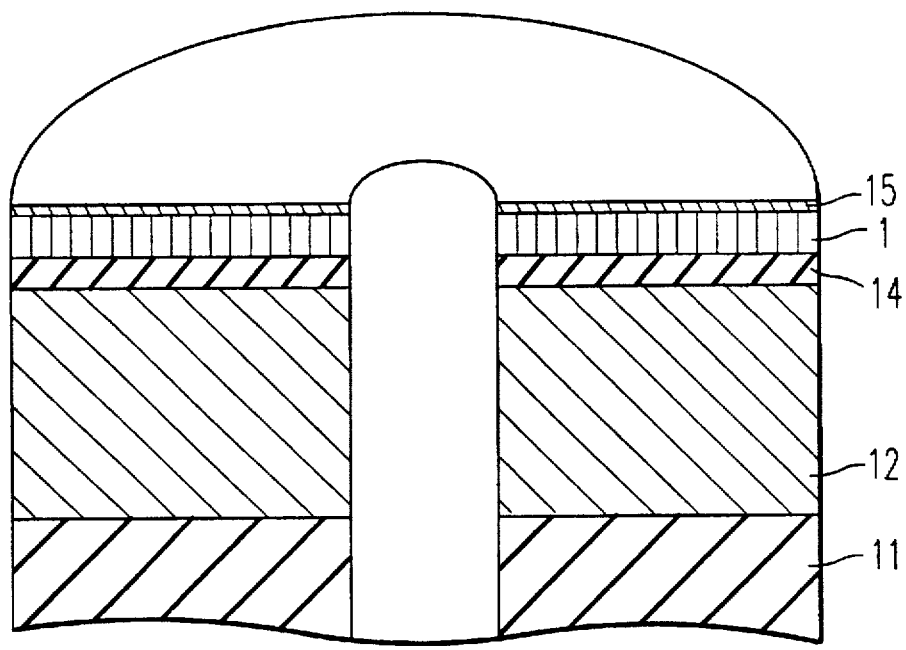
FIG. 4 is a sectional view showing another type of a perpendicular recording medium according to the present invention.
Figure 5:
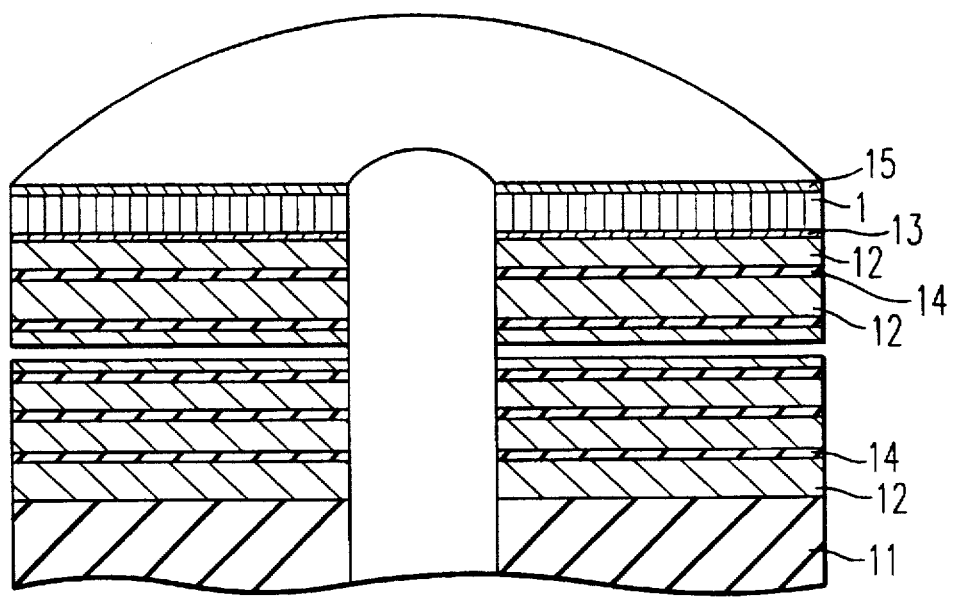
FIG. 5 is a sectional view illustrating another type of a perpendicular recording medium according to the invention.

A perpendicular recording medium according to the invention, which can suppress Barkhausen noise, may either of the two alternative structures illustrated in FIGS. 4 and 5. These structures will be described below.

The perpendicular recording medium shown in FIG. 4 comprises a substrate 11, a soft magnetic film 12, an antiferromagnetic film 14, a perpendicular magnetization film 1 and a protective film 15, which are formed one upon another in the order stated. The soft magnetic film 12 and the antiferromagnetic film 14 constitute a underlayer. This structure is designed to utilize the exchange coupling between the soft magnetic film 12 and the antiferromagnetic film 14. More specifically, due to the exchange coupling, a bias magnetic field, which is stronger than the coercivity of the soft magnetic film 12, is applied normal to the recording track of the medium (i.e., in the radial direction of the medium), thereby preventing the generation of the domain walls in the soft magnetic film.

If the medium of FIG. 4 is used, there will be the possibility that the spacing between the soft magnetic film 12 and the magnetic head of the apparatus may increase so much as to deteriorate the recording-producing characteristic of the medium. A medium designed to improve recording-producing characteristic is known, which comprises a substrate, an anti-ferromagnetic film, a soft magnetic film and a perpendicular magnetization film, which are formed one upon another in the order mentioned.

In the perpendicular recording medium of FIG. 4, the bias magnetic filed is not sufficiently intense if the soft magnetic underlayer is comparatively thick. Here, the soft magnetic underlayer should be thick; otherwise it would adversely influence the resistance of the magnetic circuit constituted by the head and the medium. The soft magnetic underlayer must be relative thick, particularly in the case where the medium of FIG. 4 is one for high-density recording and, thus, needs to have a high saturation magnetization and a high coercivity, so that a recording magnetic field having a sufficient intensity may be generated in the medium. Consequently, it is difficult with the structure of FIG. 4 to apply a sufficiently intense bias magnetic field in order to prevent the generation of domain walls in the soft magnetic underlayer. In the case of a medium comprising a substrate, a CoZrNb film formed on the substrate and having a thickness of 1.5 µm, and an FeMn film formed on the CoZrNb film, the bias magnetic field is cannot be so intense as to prevent the generation of domain walls.

The perpendicular recording medium shown in FIG. 5 is advantageous over the medium shown in FIG. 4, in that a bias magnetic field is more readily applied to the soft magnetic film. The underlayer of this medium has a multilayer structure formed of soft magnetic films and antiferromagnetic films. Any two adjacent soft magnetic films are separated by at least one antiferromagnetic film. Each antiferromagnetic film generates a bias magnetic field stronger than the coercivity of the adjacent soft magnetic film, by virtue of the exchange coupling between the antiferromagnetic film and the adjacent soft magnetic film. The bias magnetic field is applied normal to the recording track of the medium (i.e., in the radial direction of the medium), preventing the generation of the domain walls in the soft magnetic film. The antiferromagnetic films for applying a bias magnetic field may be replaced by longitudinally oriented magnetic films or artificial lattice films, which have a great coercivity. Hereinafter, any film which serves to apply a bias magnetic field will be called "bias film."

The disk-shaped, perpendicular recording medium shown in FIG. 5 will be described in greater detail. In FIG. 5, 15 layers of soft magnetic films 12 made of CoFeTa and having a thickness of 100 nm and 15 layers of antiferromagnetic films 14 made of FeMn and having a thickness of 20 nm are formed on a glass substrate 11, alternately laid one upon another. The medium further comprises a 100-nm thick soft magnetic film 12 formed on the uppermost of the films 12 and 14, a 10-nm thick nonmagnetic film 13 of Ti formed on the soft magnetic film 12, a 60-nm thick perpendicular magnetization film 1 of CoPtO formed on the nonmagnetic film 13, and a 5-nm thick protective film 15 of $SiO_2$ formed on the perpendicular magnetization film 1.

When the medium of FIG. 5 is used in a magnetic recording apparatus, the soft magnetic films 12 and the magnetic head of the apparatus constitute a magnetic circuit. While the apparatus is operating in recording mode, the films 12 efficiently apply an intense magnetic field to the perpendicular magnetization film 1. While the apparatus is operating in reproducing mode, the films 12 efficiently apply the magnetomotive force of the film 1, as a magnetic flux, to the head of the apparatus. By virtue of the exchange coupling between each antiferromagnetic film 14 and the adjacent soft magnetic film 12, a bias magnetic field is applied on the soft magnetic film 12, suppressing the forming of domain walls in the sort magnetic film 12.

As indicated above, each CoFeTa soft magnetic film 12, which contacts the adjacent FeMn antiferromagnetic film 14 has an appropriate thickness of 100 nm. Hence, the CoFeTa film 12 can maintain its permeability at 1,000 or more. Were the CoFeTa film 12 too thick, the bias magnetic field would not be intense enough to reduce noise. If the film 12 were conversely too thin, its magnetoresistance would increase (that is, its permeability would decrease), ultimately reducing the reproducing output.

Since each antiferromagnetic film 14 (or a bias film) separates two adjacent soft magnetic films 12, the thickness of the antiferromagnetic film 14 and that of one adjacent soft magnetic film 12 determine the magnitude of the bias magnetic field, while the total thickness of the films 12 determines the magnetoresistance. Thus, with the medium shown in FIG. 5 it is possible to control noise reduction and output enhancement independently.

The material of the antiferromagnetic films 14 is not limited to FeMn. Rather, the films 14 can be made of other antiferromagnetic materials such as NiO and CoO. Furthermore, the antiferromagnetic films 14 may be replaced by bias films of any other type, such as films having longitudinal anisotropy and a large coercivity, such as CoPt films, or artificial lattice films such as CoFe/Cu films. If used in place of the FeMn film 14, artificial lattice film will render the bias magnetic field uniform, thereby to minimize noise.

The soft magnetic film 12, which is closer to the substrate 11 than any other soft magnetic film, greatly influences the direction in which a bias magnetic field is applied to the entire recording medium. It may be necessary to use a soft magnetic film made of material (e.g., NiFe) whose saturation flux density is rather low, in order not to change the direction of the bias magnetic field. In this case, the medium includes two or more types of soft magnetic films, and has its saturation magnetic flux density enhanced. The medium can therefore record data in high density.

The soft magnetic films 12 may have different thicknesses, or the antiferromagnetic films 14 (namely, the bias films) may be of different materials, in accordance with the magnetism distribution of the head, thereby to change the intensity of the bias magnetic field in the thickness direction. Furthermore, the average thickness of the films may be reduced if the soft magnetic films 12 have been formed thick under conditions with better productivity. In order to impart a sufficient permeability to each soft magnetic film 12, a nonmagnetic film or a low-magnetization film may be interposed between the film 12 and either adjacent antiferromagnetic film 14.

Various types of recording-reproducing heads, which can be preferably used with the perpendicular recording medium according to this invention, will now be described with reference to FIGS. 6 to 10. For simplicity of explanation, the medium is one which comprises a substrate 11, a soft magnetic underlayer 12 formed on the substrate 11, a nonmagnetic film 13 formed on the underlayer 12, and a perpendicularly magnetization film 1 formed on the nonmagnetic film 13.

Figure 6:
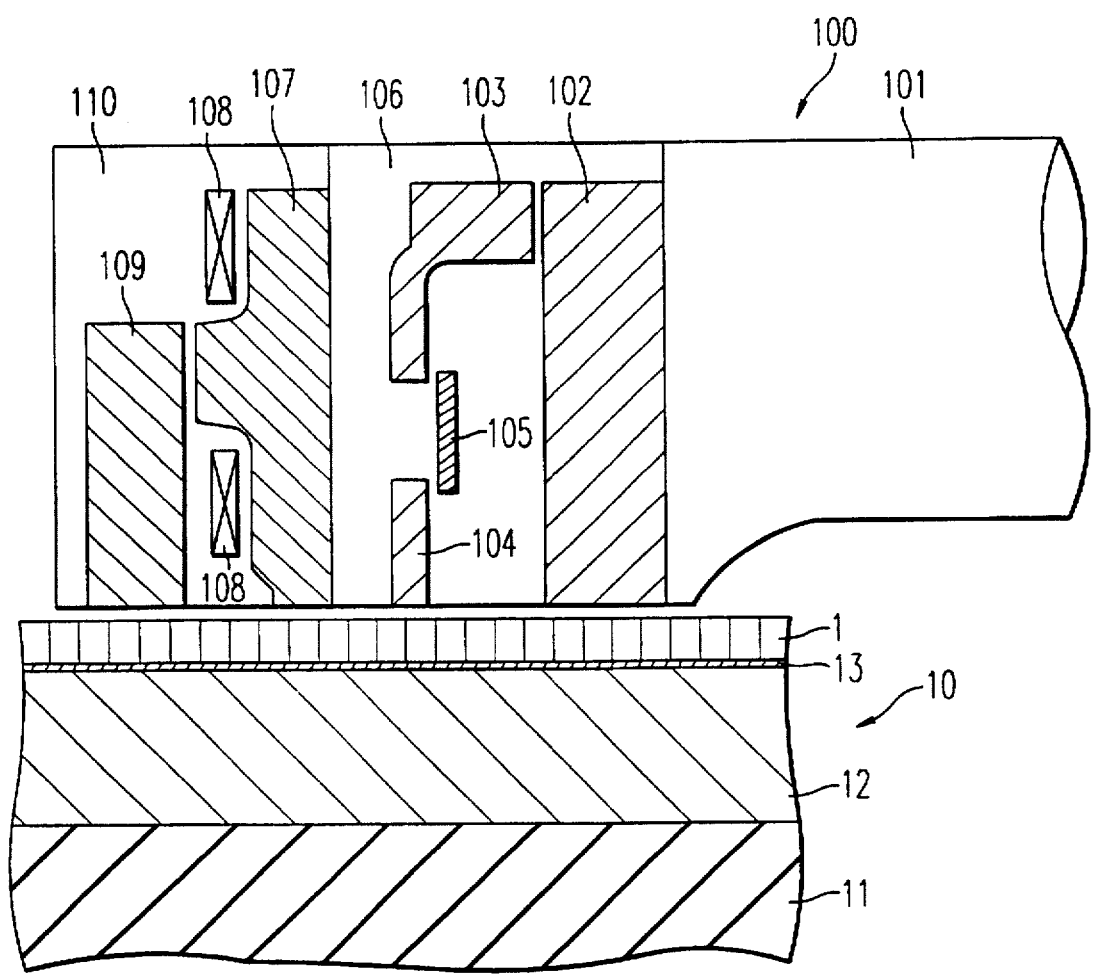
FIG. 6 is a view showing the structure of a recording-reproducing head according to the present invention.

FIG. 6 shows a magnetic head 100 having a yoke-type MR reproducing head. A return yoke 102 for reproduction is formed on the end of the arm 101. Reproduction poles 103 and 104 and an MR element 105 bridging between them are formed on the end of the return yoke 102. The MR element was made of NiFe by sputtering or was made of CoFePd/Cu multilayer. These members are covered with an insulating member 106. The lower ends of return yoke 102 and reproduction pole 104 face oppose the surface of the recording medium 10. On the end surface of the insulating member 106 there is formed a main magnetic pole 107 for recording. The lower side of the main magnetic pole 107 faces the surface of the recording medium 10. A projection protrudes from the center portion of the main magnetic pole 107. A recording coil 108 is wound around this projection. A return yoke 109 for recording is formed opposing to the projection of the main magnetic pole 107, these members are covered with an insulating member 110. The lower ends of the main magnetic pole 107 and return yoke 109 face the surface of the recording medium 10.

Figure 7:
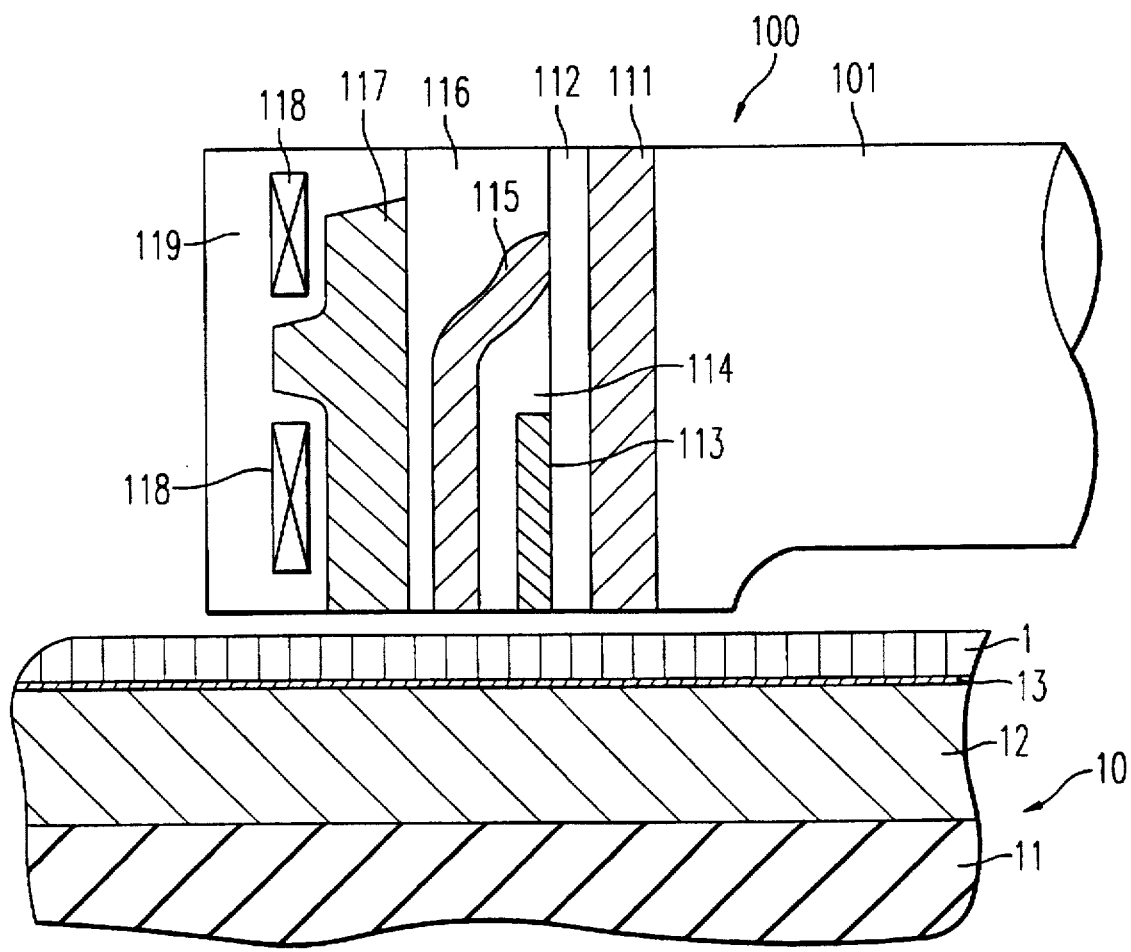
FIG. 7 is a view showing the structure of another type of a recording-reproducing head according to this invention.

FIG. 7 shows a magnetic head 100 having a shield-type MR reproducing head. A magnetic shield film 111 made of CoZrNb by DC sputtering and a nonmagnetic film 112 are formed on the and of the arm 101. An MR element 113 made of NiFe by ion-beam sputtering is formed on the nonmagnetic film 112. The lower side of the MR element 113 opposes the surface of the recording medium 10. A nonmagnetic film 114, a magnetic shield film 115, and a nonmagnetic film 116 are formed on the MR element 113 in this order. On the end surface of nonmagnetic film 116 which has been made smooth there is formed a main magnetic pole 117 made of FeSi. The lower side of the main magnetic pole 117 faces the surface of the recording medium 10. A projection protrudes from the center portion of the main magnetic pole 117. A recording coil 118 is wound around this projection. The coil 118 is covered with an insulating member 119.

Figure 8:
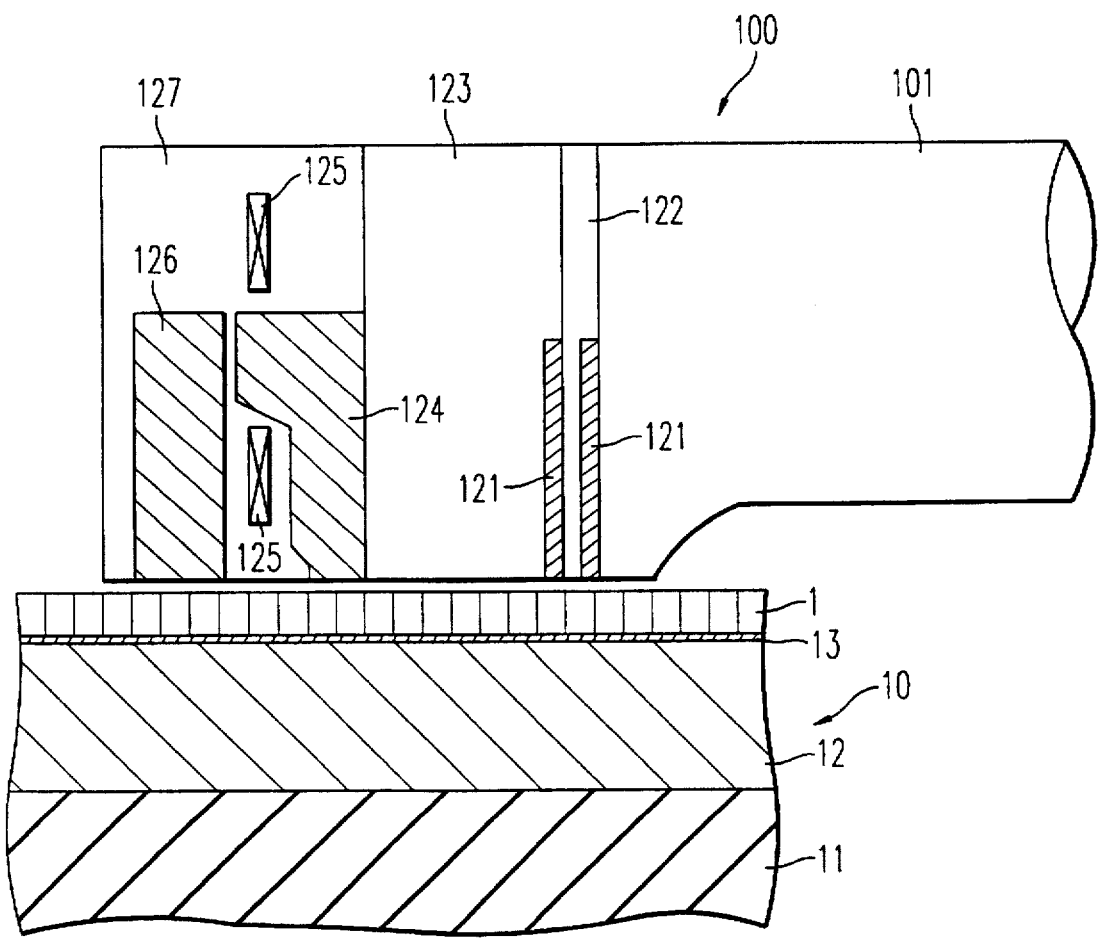
FIG. 8 is a view showing the structure of still another type of a recording-reproducing head according to the present invention.

FIG. 8 illustrates a magnetic head 100 having a dual-type MR reproducing head. An MR element 121, an insulating member 122, an MR element 121, an insulating member 123 are formed of the And of the arm 101 in this order. The MR elements 121 oppose to each other, and their lower ends oppose to the surface of the recording medium 10. On the and surface of the insulating member 123 there is formed a main magnetic pole 124 for recording. A projection protrudes on the upper portion of the main magnetic pole 124. A recording coil 125 is wound around this projection. A return yoke 126 for recording is formed opposing to the projection of the main magnetic pole 124. These members are covered with an insulating member 127. The lower ends of the main magnetic pole 124 and return yoke 126 face the surface of the recording medium 10.

Figure 9:
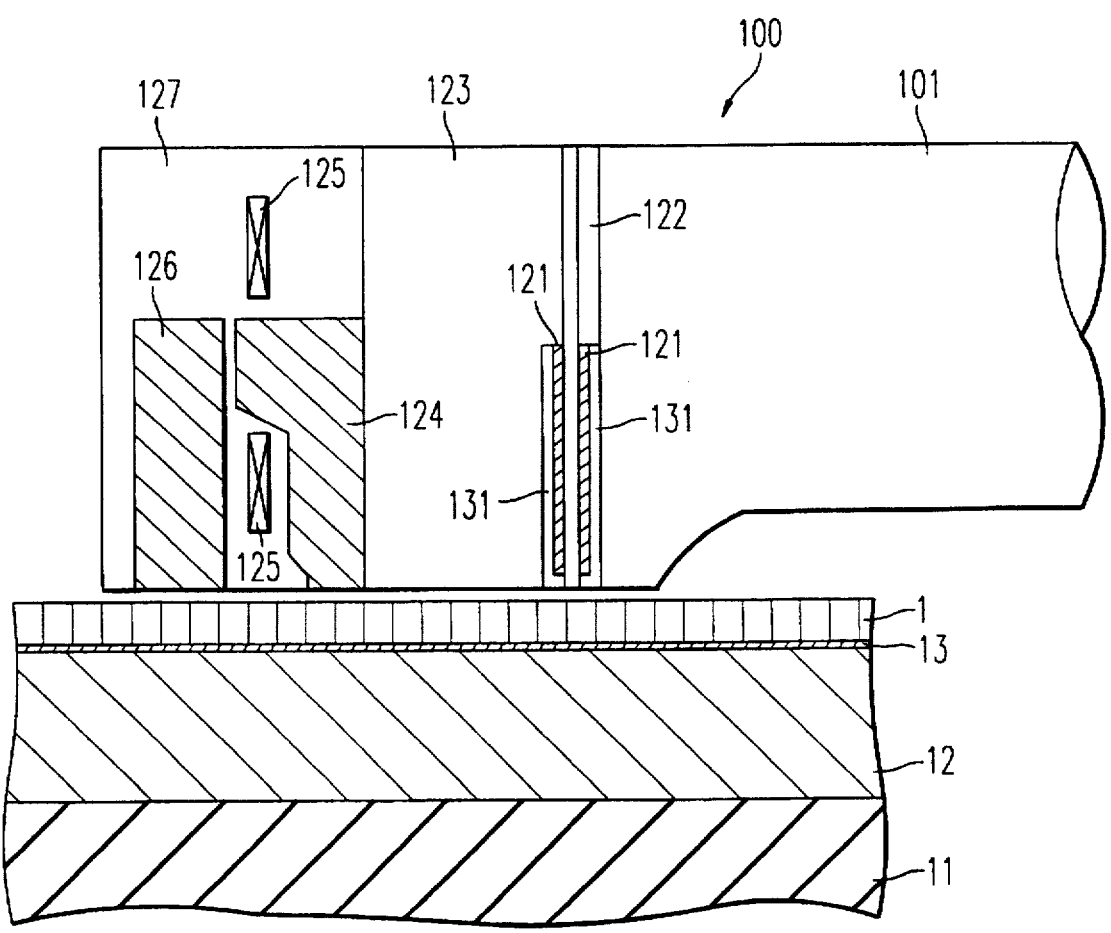
FIG. 9 is a view showing the structure of a different type of a recording-reproducing head according to this invention.

FIG. 9 shows a magnetic head having a dual-type MR reproducing head 100 which is different from the head shown in FIG. 8. The head of FIG. 9 is different to that of FIG. 8 in that soft magnetic films 131 are formed on the outer surfaces of the MR elements 121. The lower ends of the soft magnetic films 131 face the surface of the recording medium 10. The MR elements 121 are exchange-coupled with the soft magnetic films 131.

Figure 10:
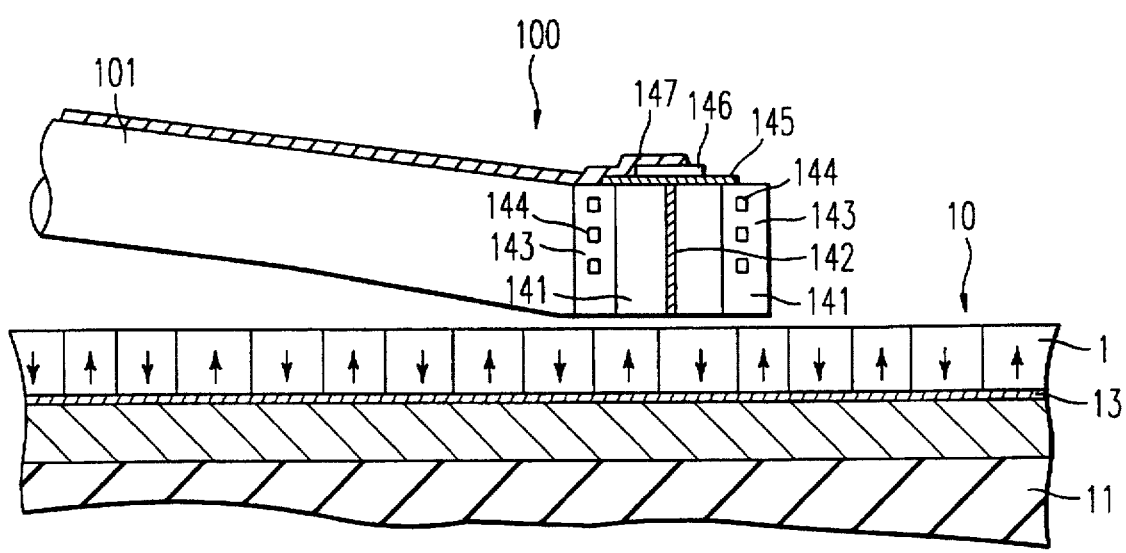
FIG. 10 is a view showing the structure of even another type of a recording-reproducing head according to the invention.

FIG. 10 illustrates a magnetic head 100 having integrated recording-reproducing heads. The head comprises a pair of main magnetic poles 141, both made of CoFe, and a nonmagnetic film 142 sandwiched between the magnetic poles 141. A recording coil 144 is wound around the poles 141. The coil 144 is covered with an insulating member 143 and has three turns. The either main magnetic poles 141 are so positioned that their lower ends oppose the recording medium 10. An insulating film 145 is formed on the upper sides of the poles 141. An MR element 146 made of Permalloy are formed on the insulating film 145. The surface of MR film 146 is parallel to that of the recording medium 10. Two leads 147 are connected to both ends of the MR film 146, respectively. Through these leads 147 a sense current is supplied to the MR film 146.

The recording and reproducing operation using each of magnetic recording apparatus above is performed as follows.

In a recording mode, a recording current is made to flow through the recording coil thereby generating a strong magnetic flux around the main magnetic pole. A recording magnetic field is generated in the perpendicular magnetization film 1, thanks to the magnetic coupling between the main magnetic pole and the soft magnetic underlayer 12 of the medium 10. The magnetic field is intense and has a narrow distribution, and magnetizes the perpendicular magnetization film 1.

While the head 100 is operated in reproducing mode, a sense current is kept flowing through the MR element. As the magnetization transition of the film 1 passes through the front of the MR element, the magnetic flux passing from the film 1 through the MR element changes sharply. The variation of the resistance in the MR element is converted into a voltage change, which can be output as a signal voltage.

The recording medium of the present invention comprises a recording medium that has a high saturation magnetization and has a large perpendicular anisotropy is combined with a perpendicular recording head. The head and the medium constitute a magnetic recording apparatus which can generate a sharp recording magnetic field and which can therefore accomplish high-density recording.

Since the perpendicular magnetization film of the medium is extremely hard, the protective film can be thinner, thereby reducing the spacings between the head and the perpendicular magnetization film and between the head and the soft magnetic underlayer. Therefore, the magnetic recording apparatus can achieve high efficiency, high resolution, and high reliability.

Furthermore, since the perpendicular magnetization film contains a phase having a low electrical conductivity, the medium has a high electrical resistance. Thus, no sense current will flow into the medium if the MR reproducing head contacts the medium, even in the case where the protective film is very thin or the medium has no protective film at all. Therefore, signals will not be deteriorated. In addition, the apparatus can generate a large reproducing output, if provided with a reproducing system having a low-resistance magnetic circuit constituted by a recording medium and a reproducing head, e.g., a yoke-type MR reproducing head of FIG. 6, through which a magnetic flux circulates.

EXAMPLES

Examples of the present invention will now be described with reference to drawings.

Example 1

A CoPt film was formed by magnetron sputtering in the following manner. A glass substrate having a thickness of 0.7 mm and a Co-20 at % Pt alloy target having a diameter of 5 inches were placed in a DC magnetron sputtering chamber with an interval between the substrate and target set to 100 mm or more. The temperature of the substrate was set to room temperature, and the chamber was evacuated to an ultimate pressure of $4 \times 10^{-5}$ Pa. The substrate was cleaned for 90 seconds by rf reverse sputtering in a pure Ar atmosphere at a pressure of 2 Pa. Then, sputtering was performed for 3 minutes in a pure Ar atmosphere of 3 Pa, at a sputtering power of 120 kW, thereby forming a CoPt film having a thickness of 50 nm or less.

The magnetic thin film thus obtained had a saturation magnetization Is of 1.5 T and a coercivity of 210 Oe. According to the measurement of the film by a torquemeter, it proved that this film was perpendicular magnetization film. The perpendicular magnetic anisotropy energy thereof was 1080 kJ/m$^3$, and the dispersion angle $\Delta\Theta_{50}$ of c-axis of CoPt was 6 deg.

This film was heat-treated at 300° C. for 1.5 hours in the atmosphere. According to Auger electron spectroscopy (AES), O, C, Co, Cl, Pt and N were detected on the surface of the heat-treated film. Further, the film was subjected to AES while etching it with Xe ion. The result was as follows: O, Co and C were detected at 1 minute later, Co, O, Pt and N were detected at 8 minutes later, and Co, O, Pt, Si and N were detected at 14 minutes later.

The oxygen concentration was higher than the Co concentration in the surface layer, whereas the oxygen concentration was slightly low and the C concentration was high on the outermost surface. It was confirmed that the oxygen concentration decreased from the surface layer inward, and increased again near the substrate. It could be judged from the etching rate that the thickness of the oxide layer on the surface should be less than 20 nm. In contrast, the nitrogen concentration was low on the surface, and high inside. However, it was confirmed that even in the region where the oxygen concentration was lowest, the oxygen concentration was higher than the nitrogen concentration.

Figure 11:
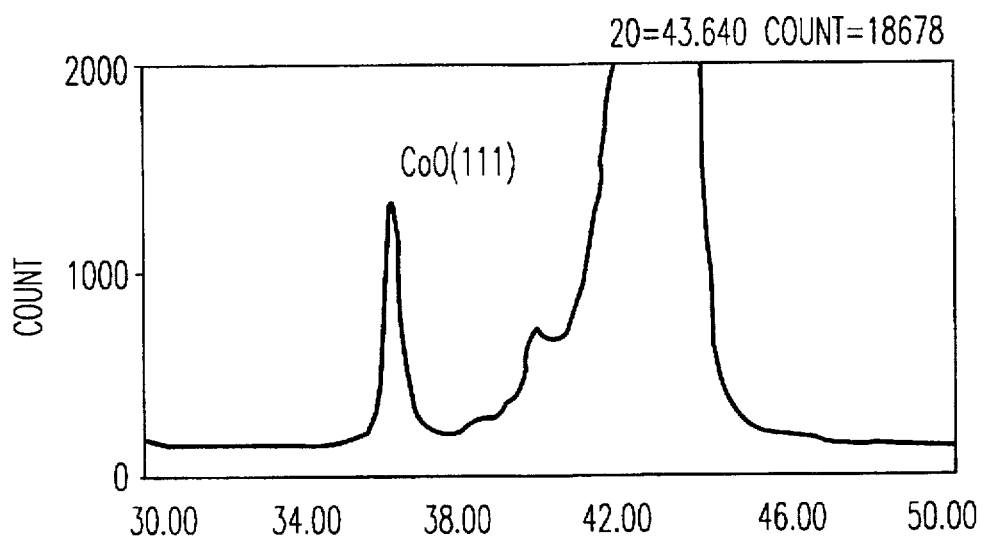
FIG. 11 is an X-ray diffraction curve of the heat-treated CoPt film produced in Example 1 of the invention.
Figure 12:
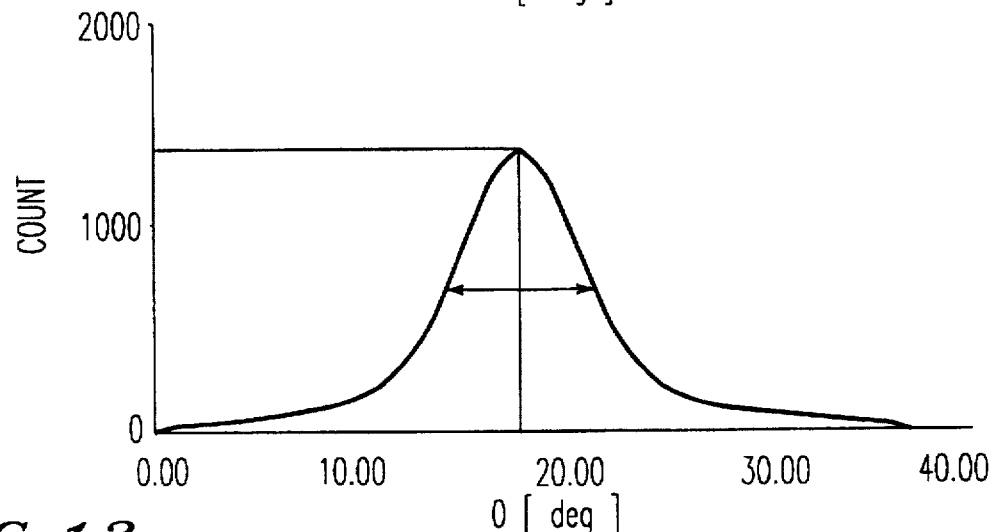
FIG. 12 is a locking curve of CoO grains in the heat-treated CoPt film produced in Example 1 of the invention.

FIG. 11 shows X-ray diffraction (XRD) of the heat-treated film. As can be seen in this figure, a peak attributed to a Co oxide, and a peak indicating that the c-axis of CoPt was oriented perpendicular to the substrate were detected. The peak of the Co oxide was shifted to the lower angle side with respect to the reflection angle obtained from a STAM card, indicating that Pt was mixed therein. The (002) reflection of the CoPt was broadened on the lower angle side, indicating that there was a region in which the lattice was stretched in the thickness direction. Even after the oxide layer on the surface was removed by etching, the intensity of the peak of Co(Pt)O decreased; however the peak did not vanish, indicating that Co(Pt)O was present also in the film. During this time, the dispersion angle $\Delta\Theta_{50}$ of c-axis of CoPt still remained as low as 6 deg or less. Further, as shown in FIG. 12, the dispersion angle $\Delta\Theta_{50}$ of the peak attributed to the CoO (111) face was as low as 7 deg or less.

According to the result of observation by field emission type-secondary electron microscopy (FE-SEM), the grains in the surface were very coarse as compared to those prior to the heat treatment, but it was confirmed that fine grains having a diameter of 10 nm or less appeared by etching.

After the etching, the film was observed with a transmission electron microscope, and the crystal structure of Co(Pt)O was detected at the boundaries of CoPt grains. Further, this film was subjected to energy dispersive method in x-ray spectroscopy (EDX) by means of hyper-resolution analytical electron microscope, and it was found that a great amount of oxygen was contained at the boundaries of CoPt grains.

Figure 13:
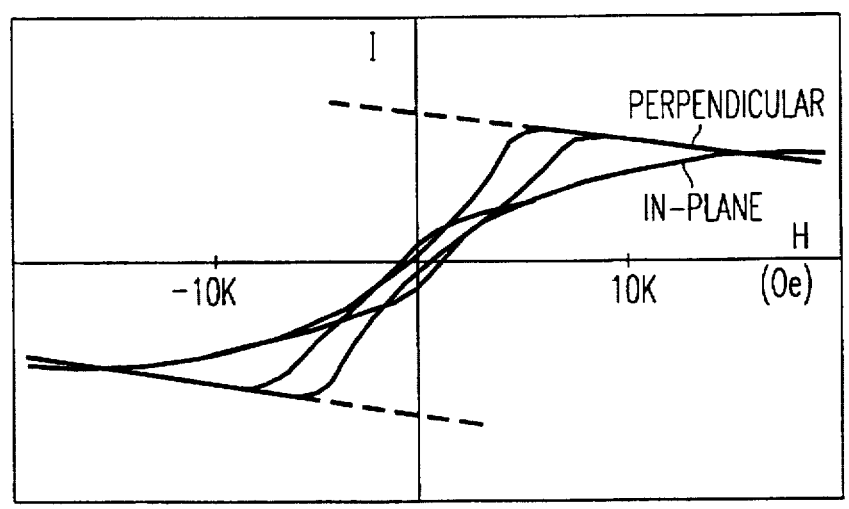
FIG. 13 is a diagram showing the I-H loop of the heat-treated CoPt film produced in Example 1 of the invention.

FIG. 13 shows an I-H loop of this film. The film had a saturation magnetization of 1.2 T and a coercivity of 500 Oe that were higher than those prior to the heat treatment. On the other hand, the squareness S and S* were 0.22 and 0.32, respectively, which did not increase as compared to those prior to the heat treatment. The perpendicular magnetic anisotropy energy of the film was 580 kJ/m$^3$ that was lower than that prior to the heat treatment. However, the ratio of the perpendicular magnetic anisotropy energy to the in-plane magnetic anisotropy energy in terms of thin film shape, was increased from 1.17, i.e. the ratio prior to the heat treatment, to 1.54.

Next, a soft magnetic underlayer made of (Co$_{90}$Fe$_{10}$)$_{92}$Ta$_8$ and having a thickness of 0.5 μm, and a non-magnetic film made of carbon having a thickness of 10 nm or less were formed on the glass substrate in this order. Thereafter, a perpendicular magnetization film made of CoPtO was further formed thereon by the above method, and thus a perpendicular magnetic recording medium having a structure shown in FIG. 3 was manufactured. It should be noted that the non-magnetic film was provided to inhibit exchange interaction occurring between the soft magnetic underlayer and the perpendicular magnetization film.

For comparison, a soft magnetic underlayer made of CoFeTa and having a thickness of 0.5 μm was formed on a glass substrate, and thereafter a conventional perpendicular magnetization film and a protective layer having a thickness of 20 nm were further formed thereon, thereby manufacturing a perpendicular magnetic recording medium (comparative example 1). The conventional perpendicular magnetization film had a saturation magnetization of 0.6 T or less, a coercivity of 1600 Oe or less and a perpendicular magnetic anisotropy energy of 150 kJ/m³ or less.

The above manufactured media, a single-pole perpendicular recording head shown in FIG. 6 and a yoke-type MR reproducing head were assembled into a magnetic recording apparatus. Using this apparatus, recording-reproducing operations were performed to examine recording density characteristics and medium S/N characteristics. During the examination, the track width was set to 4 μm or less, the flying height of the head was set such that the distance between the end surface of the head and the surface of the soft magnetic underlayer was 0.09 μm or less. It should be noted that the head might be brought into contact with the medium if the flying height is small such as above. According to the results, the apparatus of this Example exhibited excellent recording density characteristics and S/N characteristics as compared to the results obtained with the apparatus of the comparative example 1. In particular, the apparatus of the present invention had an output higher than that of the comparative example 1, at a recording density of 100 kFCI or higher.

For further comparison, a medium (comparative example 2) having a double-layer structure consisting of a soft magnetic underlayer (FeNi) and a conventional perpendicular magnetization film (CoCr), without a protective layer was manufactured. The media of this Example and the comparative example 2 were subjected to recording-reproducing operation at such a low flying height that the head might be brought into contact with the medium. According to the results, the medium of this example exhibited a good reliability against head crush as compared to that of the comparative example 2.

With the medium of this example, various effects can be achieved also when combined with each of the heads shown in FIG. 7 to FIG. 10. For example, in the medium of this example, the perpendicular magnetization film includes an oxide layer, and therefore the magnetic resistance of the surface of the medium is high. Consequently, if the sealed MR reproducing head having an MR film of which end surface faces the surface of the medium, is used to carry out reproduction with the head being in contact with the medium, the sense current of the MR head does not flow to the medium, thus achieving a highly sensitive and reliable reproduction. A similar effect can be obtained in the case where the dual MR reproducing head having MR films of which end surfaces face the surface of the medium is used. Also, in this case, a high recording resolution can be achieved.

Moreover, the recording resolution can be improved by using a dual MR reproducing head as shown in FIG. 9, in which exchange coupling occurs between the MR films and the soft magnetic poles. Further, in the case where a head in which a recording head and a reproducing head are integrated, such as shown in FIG. 10 is used, a high track density can be achieved since there is no tracking deviation between recording and reproduction.

It is also a possibility that an underlayer is made of a multilayer structure consisting of soft magnetic films and antiferromagnetic films in similar to the case shown in FIG. 5, and a non-magnetic film and the perpendicular magnetization film of this embodiment are formed on the underlayer, thus preparing a perpendicular recording medium. In this medium, a bias magnetic field larger than the coercivity is applied on the soft magnetic film in the radial direction thereof, and therefore generation of domain walls can be suppressed. Thus, the apparatus that the medium and the perpendicular recording-reproducing head are combined, can achieve reduction of noise, and accordingly reproduction of high-quality signals, thereby improving its reliability. Further, if CoFeTa is used as the soft magnetic films, the films exhibit a good crystalline property and excellent soft magnetic characteristics, and also thin antiferromagnetic films exhibit a good crystalline property, thus achieving both a large bias magnetic field and a high permeability.

In this example, a protective film was not provided on the surface of the medium, but a protective film may be formed in order to enhance the reliability, or a lubricating film may be formed further on the protective layer. Further, a film to strengthen adhesion may be formed between the substrate and the underlayer. In this case, peeling of part of the film, which may occur when the head collides with the surface of the medium, can be avoided even in the case where the underlayer is thick, thereby improving the reliability of the apparatus.

Example 2

A CoPt film was formed by DC magnetron sputtering in the following manner. A glass substrate having a thickness of 0.7 mm and a Co-20 at % Pt-5 at % Ti alloy target having a diameter of 5 inches were placed in a DC magnetron sputtering chamber with an interval between the substrate and target set to 100 mm or more. The temperature of the substrate was set to room temperature, and the chamber was evacuated to an ultimate pressure of $4 \times 10^{-5}$ Pa. The substrate was cleaned for 90 seconds by rf reverse sputtering in a pure Ar atmosphere at a pressure of 2 Pa. Then, sputtering was performed for 3 minutes in a pure Ar atmosphere of 3 Pa, at a sputtering power of 120 kW, thereby forming a CoPtTi film having a thickness of 48 nm.

The magnetic thin film thus obtained had a saturation magnetization Is of 1.26 T and a coercivity of 726 Oe. According to the measurement of the film by a torquemeter, this film was confirmed to be perpendicular magnetization film. The perpendicular magnetic anisotropy energy thereof was 1008 kJ/m³.

This film was heat-treated at 300° C. for 1.5 hours in the atmosphere. According to AES, O, C, Co, Cl, Pt, Ti and N were detected on the surface of the heat-treated film. Further, the film was subjected to the AES while etching it with Xe ion. The result was as follows: O, Co Ti and C were detected at 1 minute later, Co, O, Pt Ti and N were detected at 8 minutes later, and Co, O, Pt, Ti, Si and N were detected at 14 minutes later.

The oxygen concentration was higher than the Co concentration in the surface layer, whereas the oxygen concentration was low and the C concentration was high on the outermost surface. It was confirmed that the oxygen concentration decreased from the surface layer inward, and increased again near the substrate. It could be judged from the etching rate that the thickness of the oxide layer on the surface should be less than 20 nm. In contrast, the nitrogen concentration was low on the surface, and high inside. However, it was confirmed that even in the region where the oxygen concentration was lowest, the oxygen concentration was higher than the nitrogen concentration.

In the XRD analyses of the heat-treated film, a peak attributed to a Co oxide, and a peak indicating that the c-axis of CoPtTi is oriented perpendicular to the substrate were detected. The peak of the Co oxide was shifted to the lower angle side with respect to the reflection angle obtained from a STAM card, indicating that Pt and Ti were mixed therein. The (002) reflection of the CoPtTi was broadened on the lower angle side, indicating that there was a region in which the lattice is stretched. Even after the oxide layer on the surface was removed by etching, the intensity of the peak of Co(Pt,Ti)O decreased; however the peak did not vanish, indicating that Co(Pt,Ti)O was present also in the film.

The dispersion angle $\Delta\Theta_{50}$ of c-axis of CoPtTi was 8 deg, which was slightly wider than that of the film in which no Ti was added. Similarly, the dispersion angle $\Delta\Theta_{50}$ of the peak attributed to the Co(Pt,Ti)O (111) face was slightly widen to 9.5 deg. The full-width at a half maximum (FWHM) $\Delta I$ (002) of the hcp-phase CoPtTi (002) reflection was 0.300 deg, which was wider than that of the film to which no Ti was added. Thus, reduction of the size of crystal grain was observed. Meanwhile, the FWHM of the Co(Pt,Ti)O (111) reflection was 0.403 deg, which was larger than that of the CoPtTi(002) reflection, indicating that the crystal grain size of Co oxide was small.

According to the result of measurement by FE-SEM, the surface was rough with very coarse grains as compared to that prior to the heat treatment, but it was confirmed that fine grains having a size of 10 nm or less appeared by etching.

After the etching, the film was observed with a transmission electron microscope, and the crystal structure of Co(Pt,Ti)O was detected at the boundaries of CoPtTi grains. Further, this film was subjected to EDX by means of hyper-resolution analytical electron microscope, and it was found that the boundaries of CoPtTi grains contained a great amount of oxygen.

The film had a saturation magnetization of 0.775 T and a coercivity of 1002 Oe that was higher than that prior to the heat treatment. These values were higher than those of the film to which no Ti was added. On the other hand, the values of squareness S and S* were 0.22 and 0.32, respectively. Thus, the values of squareness S and S* did not increase as compared to those prior to the heat treatment. The perpendicular anisotropy energy of the film was 651 kJ/m$^3$ that was lower than that prior to the heat treatment. However, the ratio of the perpendicular anisotropy energy to the in-plane magnetic anisotropy energy in terms of thin film shape, was increased from 1.20, i.e. the ratio prior to the heat treatment, to 1.85.

Media manufactured by forming the film of this example on soft magnetic films such as NiFe, CoZrNb, Fe—C and CoFe, exhibited better recording density, medium S/N ratio and reliability in recording at low flying height or contact recording, than those of the conventional art. Therefore, this example is particularly suitable for high recording density magnetic recording devices whose recording density exceeds 100 kFCI and track width of 4 µm or less.

Next, a soft magnetic underlayer made of NiFe, CoZrNb, Fe—C, Fe—N, Fe—Si or CoFeTa, and a non-magnetic film having a thickness of 10 nm or less were formed on the glass substrate in this order. Thereafter, a perpendicular magnetization film made of CoPtTiO was further formed thereon by the above method, and thus a perpendicular recording medium having a structure shown in FIG. 3 was manufactured.

The above manufactured medium, a single-pole perpendicular recording head shown in FIG. 6 and a yoke-type MR reproducing head were assembled into a magnetic recording-reproducing apparatus. Using this apparatus, recording-reproducing operations were performed to examine recording density characteristics and medium S/N characteristics. The apparatus of this Example exhibited excellent recording density characteristics, S/N characteristics and reliability in recording at low flying height or in contact recording. In particular, the apparatus of the Example exhibited a high output at a recording density of 100 kFCI or higher.

In addition, Cr, Mo, W, V, Nb, Ta, Ti, Zr and Hf were supplied in place of Ti supplied to CoPt as in this Example. In any of these cases, the grain size was reduced and the coercivity was increased, as compared to the case where these elements were not added. If these elements, however, were added in amount of 10 atom % or more, the magnetocrystalline anisotropy and crystal orientation were liable to deteriorate.

Example 3

CoPtTi films were manufactured by the DC magnetron sputtering using 4 types of targets in which Ti was added to Co-20% Pt alloy in amount of 2 at %, 5 at %, 8 at % and 11 at %. The 4 types of magnetic thin films thus obtained exhibited saturation magnetizations of 1.4, 1.3, 1.2 and 1.1 T, respectively, perpendicular anisotropy field in a range of 9.5 to 6 kOe, and a coercivity in a range of 150 to 230 Oe.

Figure 14:
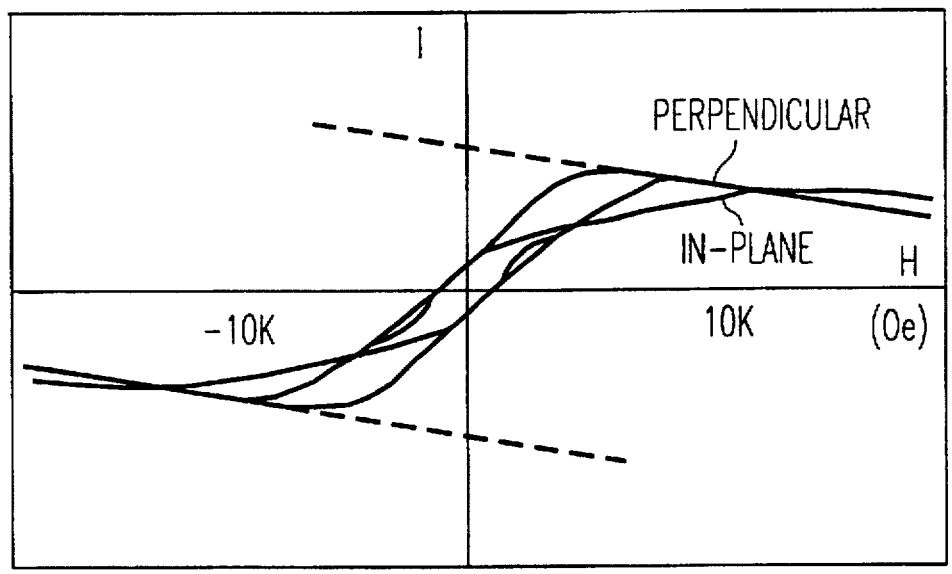
FIG. 14 is a diagram showing the I-H loop of the heat-treated CoPt film produced in Example 3 of the invention.

These 4 films were heat-treated at 300° C. for 3 hours in the atmosphere. According to XRD of the heat-treated films, it was confirmed that CoO was generated in all of the films. Each of the films was examined using an FE-SEM in terms of grain size. According to the analysis, the grain size decreased, i.e., from 10 nm to 5 nm, as the added amount of Ti increased. The heat-treated magnetic thin films respectively exhibited saturation magnetizations of 1.1, 1.0, 0.9 and 0.8 T, perpendicular anisotropy fields of 9, 10, 9 and 8 kOe, and coercivities of 600, 1000, 650 and 550 Oe. It was confirmed that the coercivity of each film was larger than 500 Oe, which was the coercive of the heat-treated film without Ti, discussed in the Example 1. FIG. 14 shows the I-H loop of the film whose Ti amount added was 5 at %.

In addition, Cr, Mo, W, V, Nb, Ta, Ti, Zr and Hf were supplied in place of Ti supplied to CoPt as in this Example. In any of these cases, the grain size was reduced and the coercivity was increased, as compared to the case where these elements were not added. If these elements, however, were added in excessive amount, the magnetocrystalline anisotropy and crystal orientation were liable to deteriorate.

Example 4

A CoPtTi film was manufactured by the DC magnetron sputtering using a Co-20 at % Pt-5 at % Ti alloy target. The film thus obtained had a saturation magnetization of 1.3 T, a perpendicular anisotropy field of 10 kOe, and a coercivity of 180 Oe.

Samples of thus obtained film were respectively heat-treated at 150° C., 225° C., 300° C., 370° C. and 450° C. for 3 hours in the atmosphere. The heat-treated samples exhibited crystal orientations of CoO different from each other for a variety of heat treatment conditions, of all the samples, the type which was heat-treated at 300° C. exhibited the strongest (111) orientation. Then, these films were measured in terms of I-H loop by means of VSM at a temperature of liquid nitrogen ($N_2$). The shapes of the measured I-H loops were compared with each other, and there was a correlation between them, indicating that the sharpness of the shoulder curve in I-H loop is rendered sharp as the orientation of CoO is bette. The relationship between heat treatment conditions, crystal orientation of CoO in the obtained film samples, and sharpness of the shoulder curve in I-H loop were summarized in Table 1 below.

TABLE 1

| Sample No. | Temperature (°C.) | $\Delta\Theta_{50}$ (deg) | Sharpness of shoulder curve in I-H loop |
|---|---|---|---|
| 1 | 150 | 12 | x |
| 2 | 225 | 9 | ○ |
| 3 | 300 | 7 | ⊚ |
| 4 | 370 | 10 | △ |
| 5 | 450 | 14 | x |

It is known that the sharpness of shoulder curve in an I-H loop is made sharpner as the magnetic dispersion is lessened. Therefore, it can be understood that a film having a less magnetic dispersion can be manufactured by improving the orientation of CoO.

Media using such a film were subjected to R/W test in a thermostat kept at a low temperature. According to the results, those types in which CoO had a (111) orientation, exhibited good properties in recording resolution, output and medium S/N ratio.

Example 5

A CoPtTi film was manufactured by the DC magnetron sputtering using a Co-20 at % Pt-5 at % Ti alloy target. The film thus obtained had a saturation magnetization of 1.5 T, a perpendicular anisotropy field of 8 kOe, and a coercivity of 150 Oe. According to the measurement of the film by a torquemeter, this film was a perpendicular magnetization film. The perpendicular anisotropy energy thereof was 1200 kJ/m$^3$, and the dispersion angle $\Delta\Theta_{50}$ of c-axis of CoPt was 6 deg.

Thus obtained film was heat-treated at 300° C. in an N$_2$ atmosphere for 1.5 hours. The film was subjected to XRD, and peaks attributed to Co$_2$N and Co$_3$N were detected. The heat-treated film exhibited a perpendicular anisotropy field of 10 kOe, and a coercivity of 480 Oe, both of which values were higher than those prior to the heat treatment. However, the dispersion angle $\Delta\Theta_{50}$ of c-axis of CoPt remained low at 6 deg, which was the same as before.

Example 6

The same CoPtTi film as was obtained in Example 5 was heat-treated at 300° C. in a CO atmosphere for 1.5 hours. The film was subjected to XRD, and peaks attributed to Co$_2$N and Co$_3$N were detected. The heat-treated film exhibited a perpendicular anisotropy field of 10 kOe, and a coercivity of 550 Oe, both of which values were higher than those prior to the heat treatment. However, the dispersion angle $\Delta\Theta_{50}$ of c-axis of CoPt remained low at 6 deg, which was the same as before.

Example 7

The same CoPtTi film as was obtained in Example 5 was left to stand in H$_2$O of pH 6.8 at 25° C. for 3 hours. The film thus obtained was subjected to XRD, and a peak attributed to cOo (111) was detected. The treated film exhibited a perpendicular anisotropy field of 10 kOe, and a coercivity of 550 Oe, both of which values were higher than those prior to the heat treatment. However, the dispersion angle $\Delta\Theta_{50}$ of c-axis of CoPt remained low at 6 deg, which was the same as before. Further, the dispersion angle $\Delta\Theta_{50}$ of the peak attributed to the CoO (111) face, also remained low at 7 deg.

Example 8

A CoPt film was formed by magnetron sputtering in the following manner. A glass substrate, which was chemically reinforced, and a Co-20 at % Pt alloy target were placed in a DC magnetron sputtering chamber with an interval between the substrate and target set to 150 mm. Sputtering was performed under the conditions in which the temperature of the substrate was set to room temperature, and the sputtering total pressure was 4 Pa, and the sputtering power to the target having a diameter of 5 inchs was 1 kW, thereby manufacturing a CoPt film having a thickness of 50 nm. During the sputtering operation, two types of gas, i.e. pure Ar gas and Ar gas mixture having an oxygen content of 0.01%, were used, and they were switched alternately 20 times. This operation was repeated with various ratios of sputtering time T[Ar+O] using the Ar-oxygen gas mixture to the total sputtering time T[t].

Figure 15:
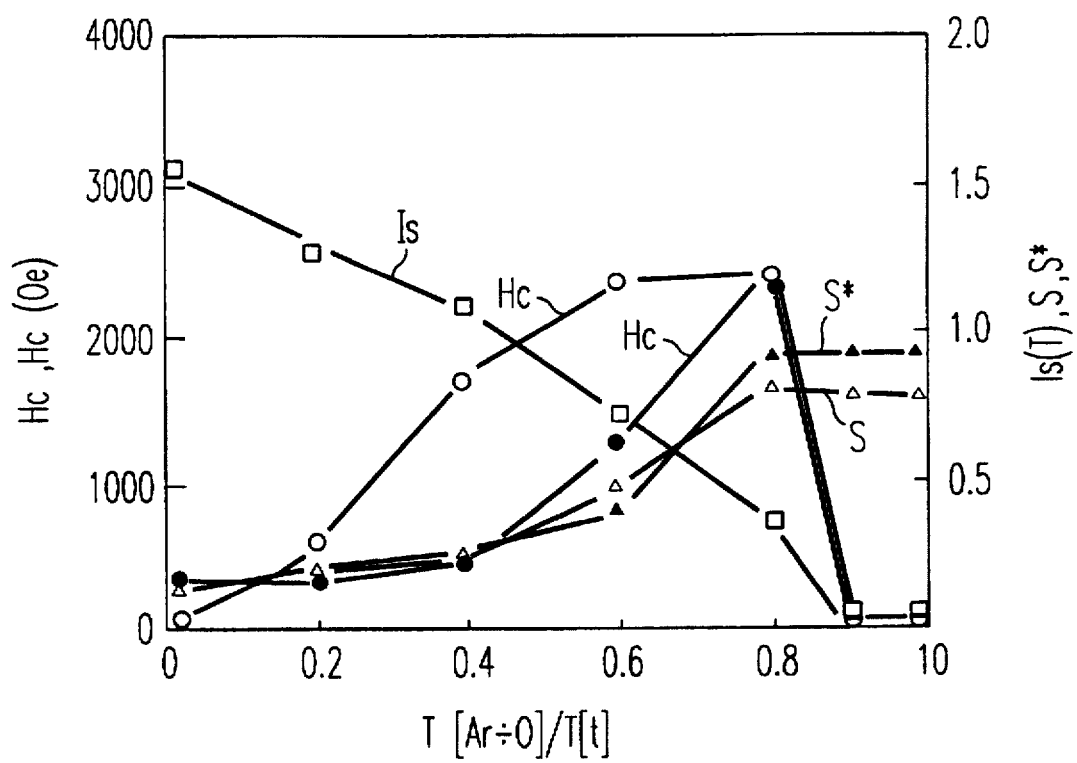
FIG. 15 is a diagram illustrating the relationship between a sputtering-time ratio T[Ar+O]/T[t], and perpendicular coercivity, in-plane coercivity, saturation magnetization Is and squareness S and S*, with respect a CoPt film formed in Example 8 of the invention.

FIG. 15 is a graph illustrating the relationship between the ratio T[Ar+O]/T[t], magnetic properties of film, i.e. perpendicular coercivity (open circles), in-plane coercivity (filled circles), saturation magnetization Is and squareness S and S*. As can be understood from FIG. 15, when T[Ar+O]/T[t] was 0.2 or more, the perpendicular coercivity was increased. In accordance with the increase in coercivity, the squarness S, i.e., the ratio of remanent magnetization to the saturation magnetization in the in-plane direction also increased. On the other hand, the saturation magnetization was liable to decrease. However, the film manufactured under the condition in which, for example, T[Ar+O]/T[t] was 0.4, exhibited a high perpendicular coercivity of 1700 Oe, a low squareness in the in-plane direction of 0.3 or less, and a sufficiently large saturation magnetization of 1.1 T.

Figure 16:
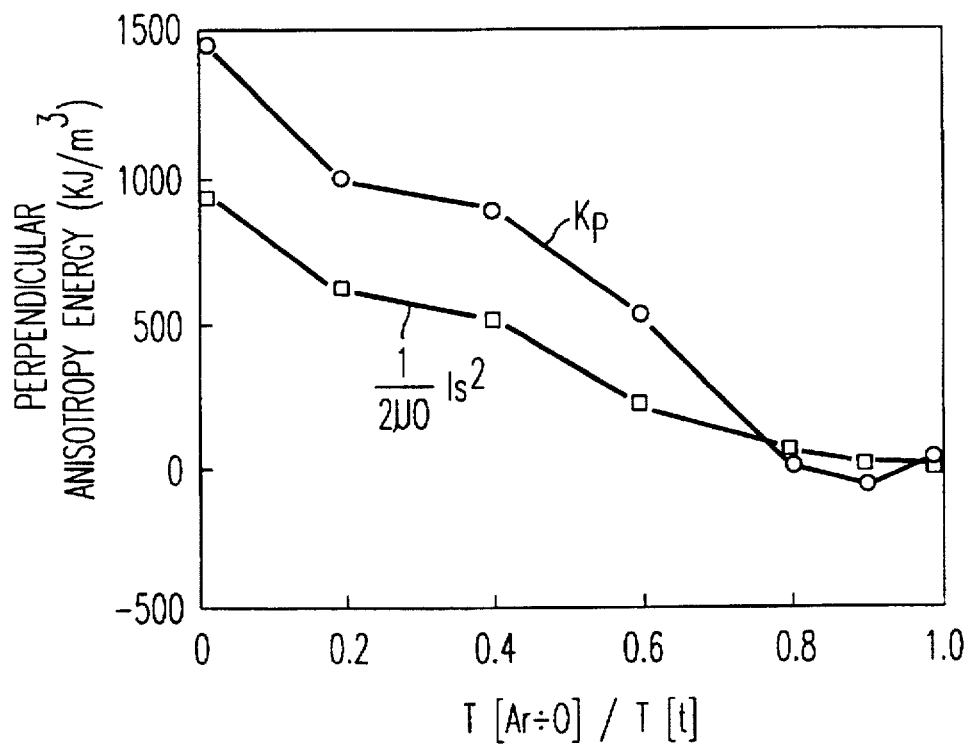
FIG. 16 is a diagram representing the relationship between the sputtering-time ratio T[Ar+O]/T[t] and perpendicular anisotropy energy of the CoPt film formed in Example 8 of the invention.

FIG. 16 is a graph illustrating the relationship between T[Ar+O]/T[t] and perpendicular anisotropy energy (Kp= Ku$^{exp}$+Is$^2$/2 $\mu_o$) measured by the magnetic torque meter. The film formed under the condition of T[Ar+O]/T[t] set at 0.4 was found to be a perpendicular magnetization film having a Kp value of 900 kJ/m$^3$.

According to AES, O, C, Co, Pt, Cl and N were detected on the surface of the film. Further, the film was subjected to AES while etching it with Xe ion. The oxygen concentration was higher than the Co concentration in the surface layer, whereas the oxygen concentration was slightly lower on the outermost surface than that in the surface layer, and rather the C concentration was high. It was confirmed that the oxygen concentration decreased from the surface layer inward, and increased again near the substrate. It could be judged from the etching rate that the thickness of the oxide layer on the surface should be less than 5 nm. It was further confirmed that the nitrogen concentration was lower than the oxygen concentration in any region.

According to XRD of the film, a peak indicating that the c-axis of CoPt is oriented perpendicular to the substrate were-detected. The (002) reflection of the CoPt exhibited an asymmetrical shape broadened on the lower angle side than on the wide angle side, indicating that there was a distorted region in which the lattice was stretched in the c-axis direction. Meanwhile, the dispersion angle $\Delta\Theta_{50}$ of the c-axis of CoPt was as low as 8 deg or less.

According to the result of analysis with FE-SEM, the film was made of fine grains having a diameter of 15 nm or less. Further, the film was observed with a transmission electron microscope, and it was confirmed that the film consisted of grains having a diameter of 15 nm or less, and amorphous phase. The ratio of the amorphous phase to the total area was 50% or less.

Figure 17:
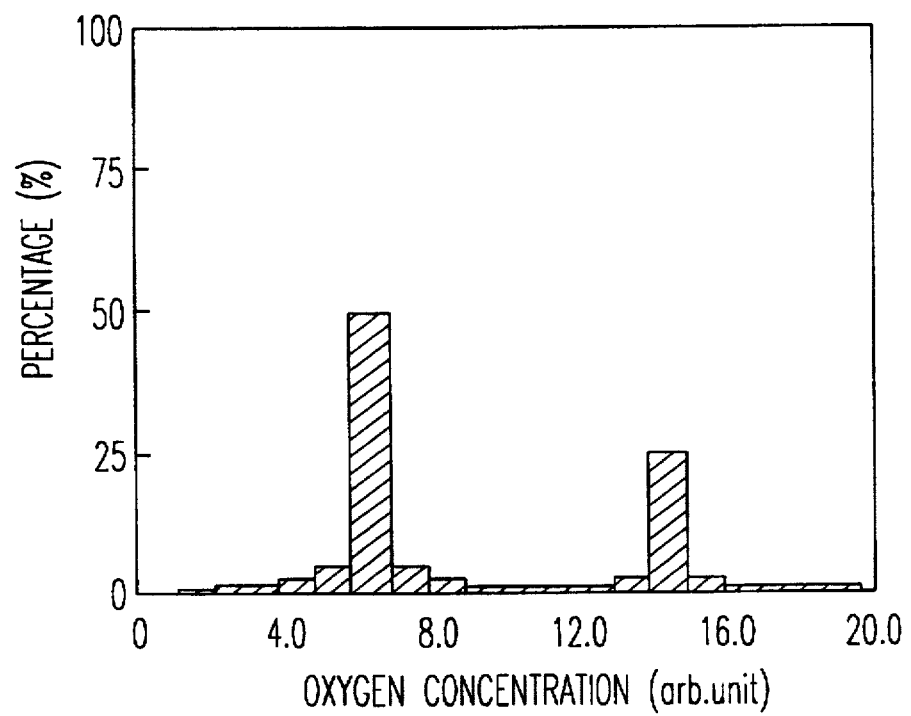
FIG. 17 is a diagram depicting the surface oxygen-concentration distribution of the CoPt film formed in Example 8 of the invention.

This film was examined in terms of oxygen concentration by EDX using an analytical electron microscope. In this examination, the surface of the film was divided into a lattice of very fine square regions each having sides of few nanometers, and the oxygen concentration at each region was measured. FIG. 17 is a graph illustrating the ratio of the area of regions having a given oxygen concentration to the total area of the regions analyzed (such a graph will be called "oxygen-concentration distribution" hereinafter). As is clear from this figure, the oxygen-concentration distribution on the surface of the film had two peaks. It is considered that the fine regions of high oxygen concentration were amorphous, and therefore stood for grain boundaries, whereas the fine regions of low oxygen concentration represented the inner portions of crystal grains.

For comparison, CoPt films were manufactured by means of the conventional technique using Ar-oxygen mixture gas only under a total pressure of 2 Pa, with various oxygen concentrations in sputtering gas. According to the results, the perpendicular coercivity was liable to increase as the oxygen concentration was increased. However, the films having a perpendicular coercivity of 1300 Oe or more could not be used as appropriate perpendicular magnetization film because the in-plane squareness S and S* were excessively increased.

Figure 18:
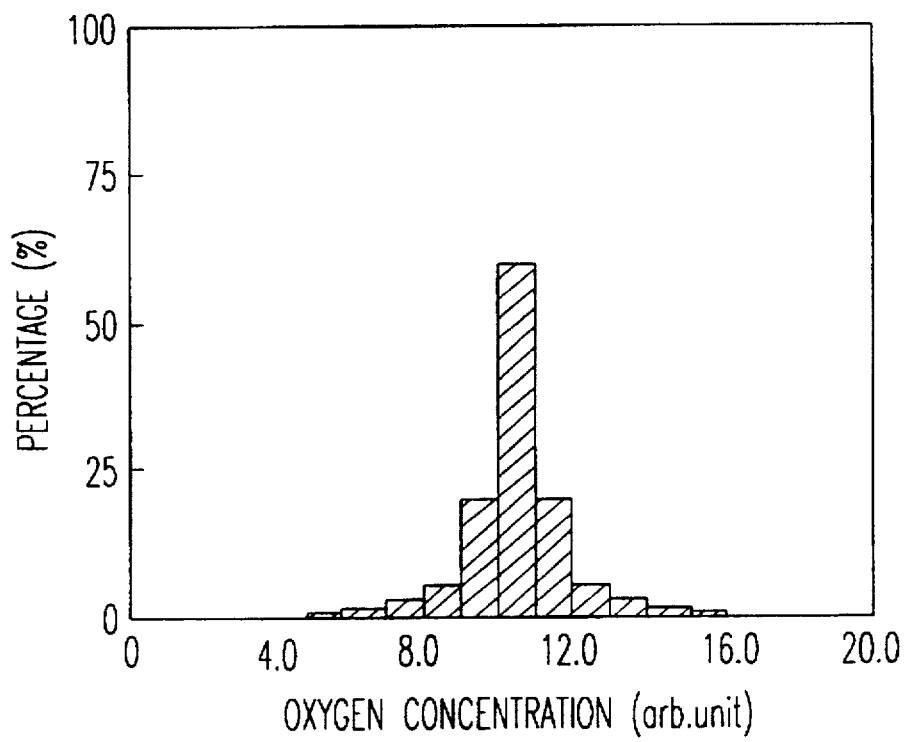
FIG. 18 is a diagram demonstrating the surface oxygen-concentration distribution of a CoPt film formed by using a sputtering gas of an argon-oxygen mixture.

These films were examined in terms of oxygen concentration distribution of surface in similar to the case shown in FIG. 17, and the results were as illustrated in FIG. 18. As is clear from the graph shown in FIG. 18, the films formed using a single mixture gas of Ar and oxygen, had only one peak in its oxygen concentration distribution on surface, indicating that oxygen is substantially uniformly dispersed.

Those films of this Example which had two peaks in oxygen concentration distribution as shown in FIG. 17 were subjected to measurement in terms of reflection X-ray diffraction, and separation of peak was detected along with the peaks of oxygen concentration.

Next, a soft magnetic underlayer made of CoFeTa and having a thickness of 0.5 µm, and a non-magnetic film having a thickness of 10 nm or less were formed on the glass substrate in this order. Thereafter, a perpendicular magnetization film made of CoPtO was further formed thereon by the above method, and thus a perpendicular recording medium having a structure shown in FIG. 3 was manufactured.

For comparison, the perpendicular recording medium of comparative example 1 was used.

The above manufactured media, a single-pole perpendicular recording head shown in FIG. 6 and a yoke-type MR reproducing head were assembled into a magnetic recording apparatus. Using this apparatus, recording-reproducing operations were performed to examine recording density characteristics and medium S/N characteristics. During the examination, the track width was set to 4 µm or less, the flying height of the head was set such that the distance between the end surface of the head and the surface of the soft magnetic under was 0.09 µm or less. It should be noted that the head might be brought into contact with the medium if the flying height is small such as above. According to the results, the apparatus of this Example exhibited excellent recording density characteristics and S/N characteristics as compared to the apparatus of the comparative example 1. In particular, the apparatus of the present invention had an output higher than that of the comparative example 1, at a recording density of 100 kFCI or higher. Further, the apparatus exhibited a good reliability against head crush even in the case where recording-reproducing was performed at low flying height such that the head and medium might be brought into contact with each other.

With the medium of this example, various effects similar to those discussed in Example 1 can be achieved also when combined with each of the heads shown in FIG. 7 to FIG. 10.

It is also a possibility that an underlayer is made of a multilayer structure consisting of soft magnetic films and antiferromagnetic films in similar to the case shown in FIG. 5, and a non-magnetic film and the perpendicular magnetization film of this embodiment are formed on the underlayer, thus preparing a perpendicular recording medium. In this medium, a bias magnetic field larger than the coercivity is applied on the soft magnetic film in the radial direction thereof, and therefore generation of domain walls can be suppressed. Thus, the apparatus in which the medium and the recording-reproducing head are combined, can achieve reduction of noise, and accordingly reproduction of high-quality signals, thereby improving its reliability. Further, if CoFeTa is used as the soft magnetic film, the medium exhibits a good crystalline property and excellent soft magnetic characteristics, thus making it possible to achieve both a large bias magnetic field and a high permeability.

In this example, a protective film was not provided on the surface of the medium, but a protective film may be formed in order to enhance the reliability, or a lubricating film may be formed further on the protective layer. Also, a film yo strengthen adhesion may be formed between the substrate and the underlayer. Thus, peeling of part of the film, which may occur when the head collides with the surface of the medium, can be avoided even in the case where the underlayer is thick, thereby improving the reliability of the apparatus.

It should be noted that CoPt was used in this example, but similar effect could be obtained with other Co alloys such as CoNi and CoCr.

Example 9

A CoPt film was formed by magnetron sputtering in the following manner. A glass substrate, which was chemically reinforced, and a Co-20 at % Pt alloy target having a diameter of 5 inches were placed in a DC magnetron sputtering chamber with an interval between the substrate and target set to 150 mm. Sputtering was performed under the conditions in which the temperature of the substrate was set to room temperature, and Ar gas having an oxygen content of 0.01% was used as sputtering gas, and the sputtering power per 5 inch size was 1 kW, thereby manufacturing a CoPt film having a thickness of 50 nm. During the sputtering operation, the sputtering pressure was switched between 1 Pa and 10 Pa alternately 20 times. This operation was repeated with various ratios of sputtering time T[10 Pa] by a sputtering pressure of 10 Pa to the total sputtering time T[t].

Figure 19:
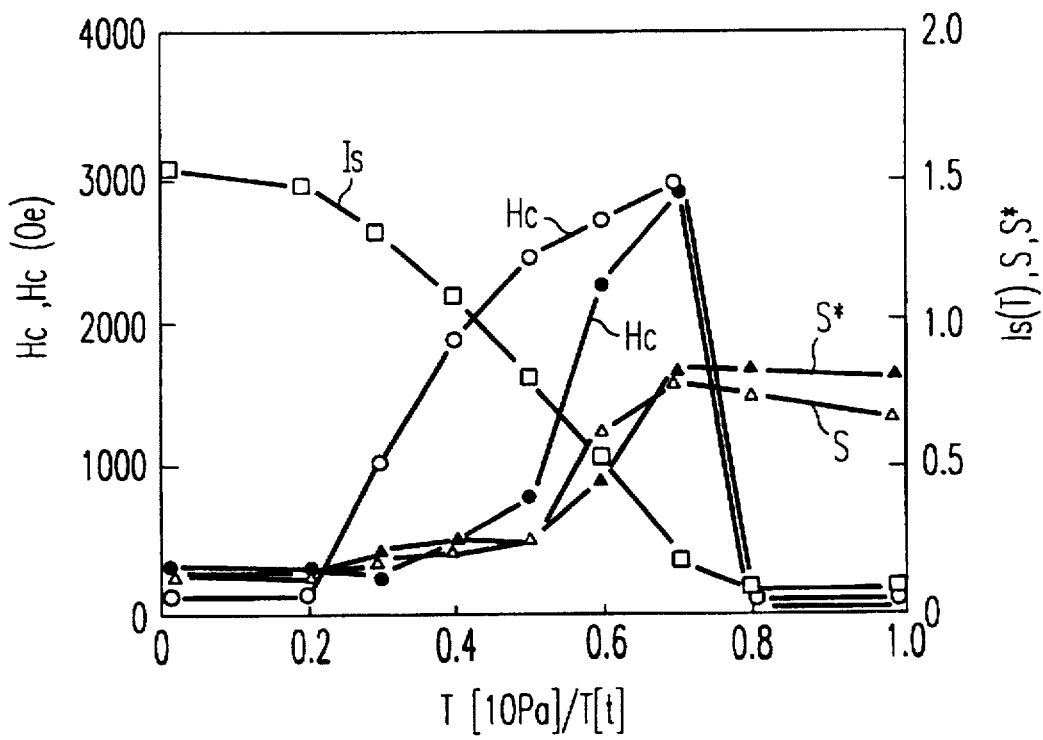
FIG. 19 is a diagram illustrating the relationship between a sputtering-pressure ratio T[10Pa]/T[t], and perpendicular coercivity, in-plane coercivity, saturation magnetization Is and squareness S and S*, with respect to a CoPt film formed in Example 9 of the invention.

FIG. 19 is a graph illustrating the relationship between the ratio T[10 Pa]/T[t], magnetic properties of film, i.e. perpendicular coercivity (open circles), in-plane coercivity (filled circles), saturation magnetization Is and squareness ratios S and S*. As can be understood from FIG. 19, when T[10 Pa]/T[t] was 0.2 or more, the perpendicular coercivity was increased. In accordance with the increase in coercivity, the ratio S of remanent magnetization to the in-plane saturation magnetization also increased. On the other hand, the saturation magnetization was liable to decrease. As an exception, the film manufactured under the condition in which, for example, T[10 Pa]/T[t] was 0.5, exhibited a high perpendicular coercivity of 2500 Oe, a low squareness in the in-plane direction of 0.3 or less, and a sufficiently large saturation magnetization of 0.8 T.

Figure 20:
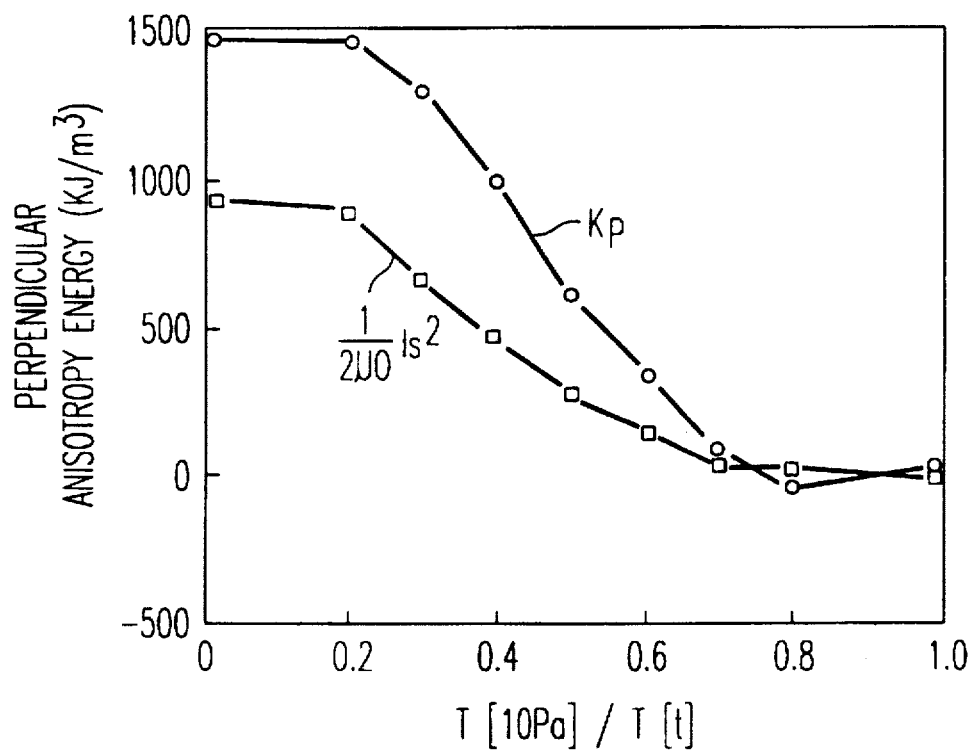
FIG. 20 is a diagram representing the relationship between the sputtering-pressure ratio T[10Pa]/T[t] and perpendicular anisotropy energy of the CoPt film formed in Example 9 of the invention.

FIG. 20 is a graph illustrating the relationship between T[10 Pa]/T[t] and perpendicular magnetic anisotropy energy (Kp=Ku$^{exp}$+Is$^2$/2 μo) measured by the magnetic torque meter. The film formed under the condition of T[10 Pa]/T[t] set at 0.5 was found to be a perpendicular magnetization film having a Kp value of 600 kJ/m$^3$.

This film was examined in terms of oxygen concentration by EDX using an analytical electron microscope. In this examination, the surface of the film was divided into a lattice of very fine square regions each having sides of few nanometers, and the oxygen concentration at each region was measured to determine the ratio of the area of regions having a given oxygen concentration to the total area of the regions analyzed. According to the results, the oxygen concentration distribution of the surface of the film had two peaks.

For comparison, CoPt films were manufactured by means of the conventional technique using Ar gas having an oxygen content of 0.01% as sputtering gas, with various sputtering total pressures. According to the results, the perpendicular coercivity was liable to is increase when the sputtering total pressure was 3 Pa or more. However, the films having a perpendicular coercivity of 1300 Oe or more could not be used as appropriate perpendicular magnetization film because the in-plane squareness ratios S and S* were excessively increased to 0.5. Further, these films had only one peak in its oxygen concentration distribution on surface, indicating that oxygen was substantially uniformly dispersed.

Those films of this Example which had two peaks in oxygen concentration distribution were subjected to measurement in terms of reflection X-ray diffraction, and separation of peak was detected along with the peaks of oxygen concentration.

Further, as in the case of Example 8, a soft magnetic film, a non-magnetic film and a perpendicular magnetization film were laminated on the glass substrate, thus manufacturing a perpendicular magnetic recording medium. The above manufactured medium was combined with the head shown in FIG. 6 into a magnetic recording apparatus. Using this apparatus, recording-reproducing operations were performed by contact recording to examine recording density characteristics. According to the results, the apparatus of this Example exhibited a high linear recording resolution and low noise as compared to the case where convention medium was used. In other examinations conducted in similar to those of the Example 8, similar results were obtained.

Example 10

A CoPt film was formed by magnetron sputtering in the following manner. A glass substrate, which was chemically reinforced, and two Co-20 at % Pt alloy targets having a diameter of 5 inchs (No. 1 and No. 2) were placed in a DC magnetron sputtering chamber with an interval between the substrate and target set to 150 mm. Sputtering was performed under the conditions in which the temperature of the substrate was set to room temperature, and Ar gas having an oxygen content of 0.01% was used as sputtering gas, and the sputtering powers for No. 1 and No. 2 were respectively set at constant 3.0 kW/5 inch (W[1]) aid at constant in a range of 0.06–3.0 kW/5 inch (W[2]), thereby manufacturing a CoPt film having a thickness of 50 nm.

Figure 21:
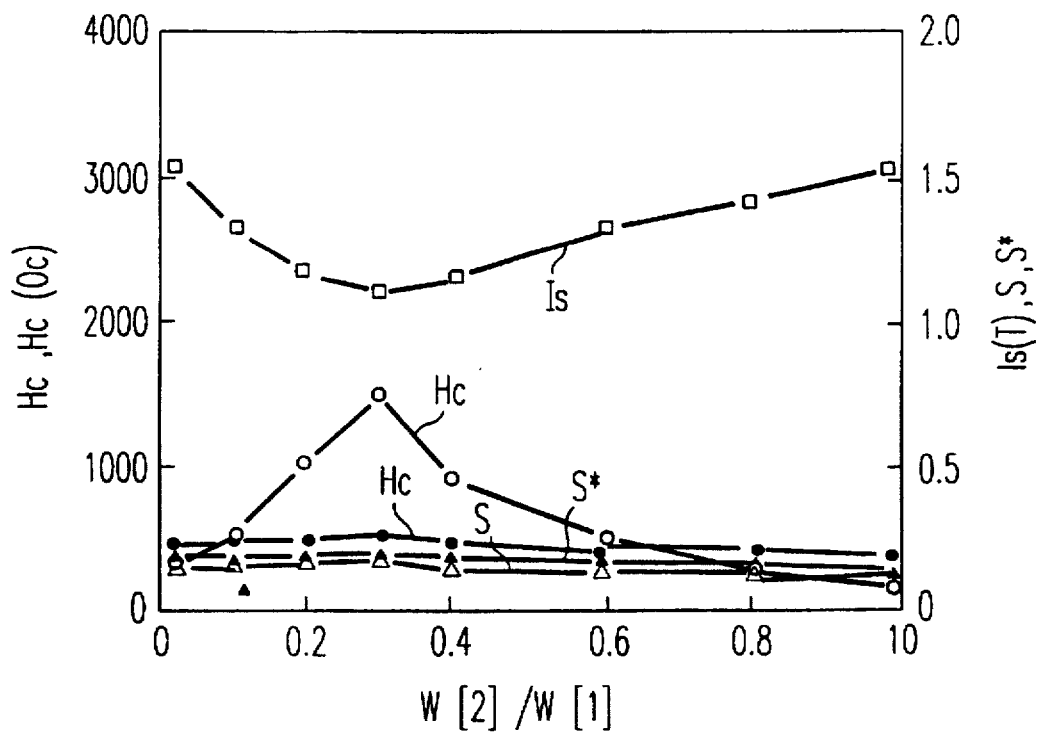
FIG. 21 is a diagram depicting the relationship between a sputtering-power ratio W[2]/W[1] between two targets, and perpendicular coercivity, in-plane coercivity, saturation magnetization Is and squareness S and S*, with respect to a CoPt film formed in Example 10 of the invention.

FIG. 21 is a graph illustrating the relationship between the ratio W[2]/W[1], magnetic properties of film, i.e. perpendicular coercivity (open circles), in-plane coercivity (filled circles), saturation magnetization Is and squareness ratios S and S*. As can be understood from FIG. 21, when T[10 Pa]/T[t] was about 0.3, an increase in perpendicular coercivity was detected. The film manufactured under the condition in which W[2]/W[1] was 0.3, exhibited a perpendicular coercivity of 1500 Oe, and a saturation magnetization of 1.1 T. Also, the perpendicular magnetic anisotropy energy Kp of the film was measured by the magnetic torque meter, and it was found that the film was a perpendicular magnetization film having a Kp value of 900 kJ/m$^3$.

This film was examined in terms of oxygen concentration by EDX using an analytical electron microscope. In this examination, the surface of the film was divided into a lattice of very fine square regions each having a side of a few nanometers, and the oxygen concentration at each region was measured to determine the ratio of the area of regions having a given oxygen concentration to the total area of the regions analyzed. According to the results, the oxygen concentration distribution of the surface of the film had two peaks, as in the case shown in FIG. 17.

For comparison, CoPt films were manufactured by means of the conventional technique using the target No. 2 only, with various sputttering powers. According to the results, an increase in perpendicular coercivity was detected when the sputtering power was in a range of 0.08 to 2.0 kW. However, the films having a perpendicular coercivity of 1300 Oe or more could not be used as appropriate perpendicular magnetization film because the in-plane squareness ratios S and S* were excessively increased to 0.5. Further, these films had only one peak in its oxygen concentration distribution on surface, indicating that oxygen was substantially uniformly dispersed.

Those films of this Example which had two peaks in oxygen concentration distribution were subjected to measurement in terms of reflection X-ray diffraction, and separation of peak was detected along with the peaks of oxygen concentration.

Further, as in the case of Example 8, a soft magnetic film, a non-magnetic film and the perpendicular magnetization film of this example were laminated on the glass substrate, thus manufacturing a perpendicular magnetic recording medium. The above manufactured medium was combined with the head shown in FIG. 6 into a magnetic recording-reproducing apparatus. Using this apparatus, recording-reproducing operations were performed by contact recording to examine its recording density characteristics. According to the results, the apparatus of this Example exhibited a high linear recording resolution and low noise as compared to the case where convention medium was used. In other examinations conducted in similar to those of the Example 8, similar results were obtained.

Example 11

A CoPt film was formed by magnetron sputtering in the following manner. A glass substrate, which was chemically reinforced, and a Co-20 at % Pt alloy target plate having a diameter of 5 inches were placed in a DC magnetron sputtering chamber with an interval between the substrate and target set to 90 mm. Sputtering was performed under the conditions in which the temperature of the substrate was set to room temperature, and the sputtering total pressure was set at 4 Pa, and the sputtering electrical power per 5 inch size was 1 kW, thereby manufacturing a CoPt film having a thickness of 50 nm. During the sputtering operation, two types of gas, i.e. Xe gas having an oxygen content of 0.01% and Ar gas having an oxygen content of 0.01%, were used. This operation was performed with various ratios of the mixture of the above two types gas.

Figure 22:
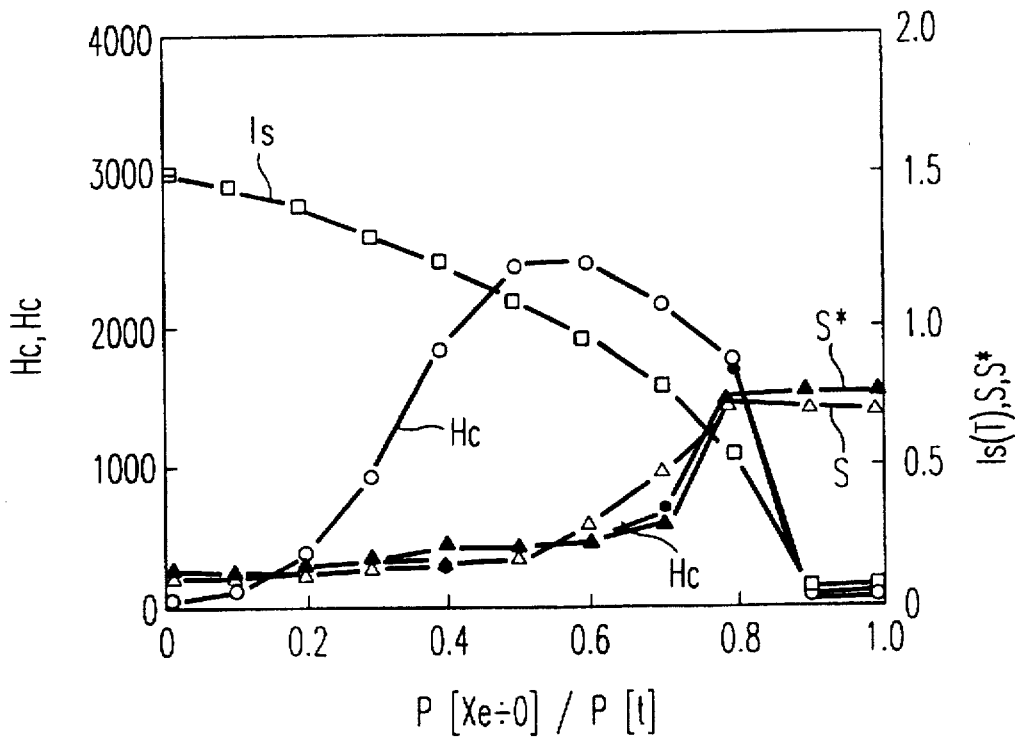
FIG. 22 is a diagram showing the relationship between a sputtering-pressure ratio P[Xe+O]/P[t], and perpendicular coercivity, in-plane coercivity, saturation magnetization Is and squareness S and S*, with respect to a CoPt film formed in Example 11 of the invention.

FIG. 22 is a graph illustrating the relationship between the ratio of the pressure P[Xe+O] of the oxygen-containing Xe gas to the total pressure P[t], magnetic properties of film, i.e. perpendicular coercivity (open circles), inplane coercivity (filled circles), saturation magnetization Is and squareness ratios S and S*. As can be understood from FIG. 22, when P[Xe+O]/P[t] was in a range of 0.2 to 0.8, the perpendicular coercivity was increased. The in-plane squareness ratios S and S* were small when P[Xe+O]/P[t] was up to 0.5, indicating the characteristic of perpendicular magnetization film, whereas these ratios S and S* were increased when P[Xe+O]/P[t] exceeded 0.5, indicating prominent characteristics of in-plane magnetizing film. On the other hand, as P[Xe+O]/P[t] increased, the in-plane saturation magnetization was liable to decrease.

Figure 23:
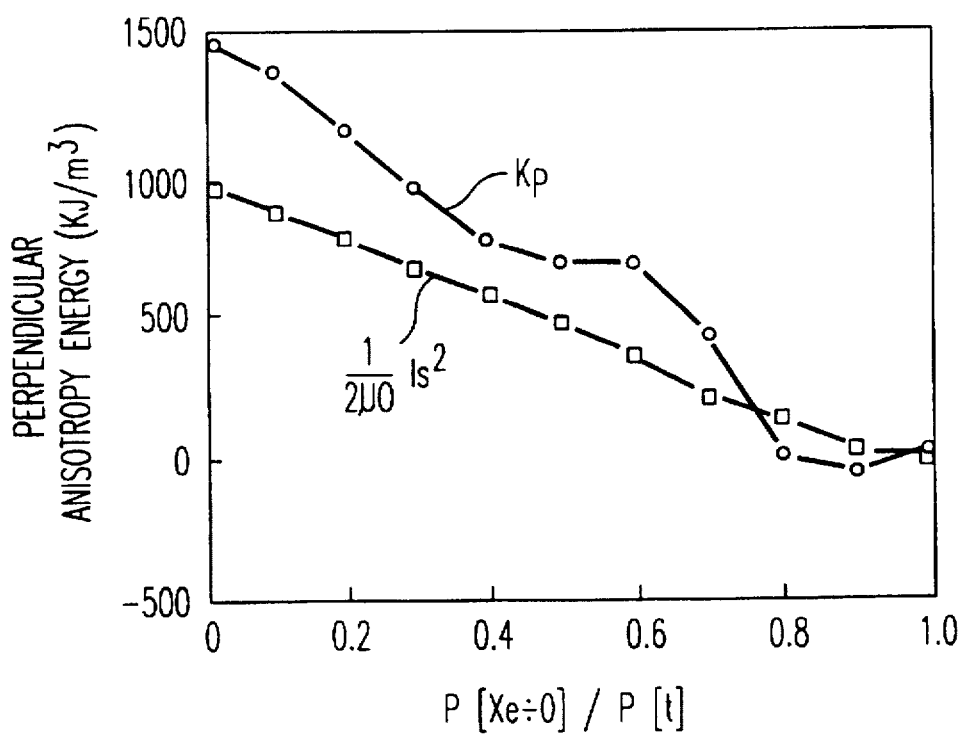
FIG. 23 is a diagram representing the relationship between the sputtering-pressure ratio P[Xe+O]/P[t] and perpendicular anisotropy energy of the CoPt film formed in Example 11 of the invention.

FIG. 23 is a graph illustrating the relationship between P[Xe+O]/P[t] and perpendicular magnetic anisotropy energy (Kp=Ku$^{ew}$+Is$^2$/2 µo) measured by the magnetic torque meter. The film formed with the oxygen-containing Ar gas only exhibited a large Kp value of 1500 kJ/m$^3$. As the P[Xe+O]/P[t] value increased, the saturation magnetization decreased, and so did the Kp value, eventually, when the P[Xe+O]/P[t] value was 0.8 or more, the Kp value was substantially zero.

As is clear from the above-described results, a film having a large perpendicular coercivity and an in-plane coercivity using the two types of gas. For example, when the P[Xe+O]/P[t] is 0.5, a perpendicular magnetization film having a saturation magnetization of 1 T ore more, a perpendicular magnetic anisotropy energy of 700 kJ/m$^3$, and a perpendicular coercivity of 2400 Oe, can be obtained. Or, when the P[Xe+O]/P[t] is 0.8, an in-plane magnetizing film having an in-plane coercivity of 1750 Oe, can be obtained.

Figure 24:
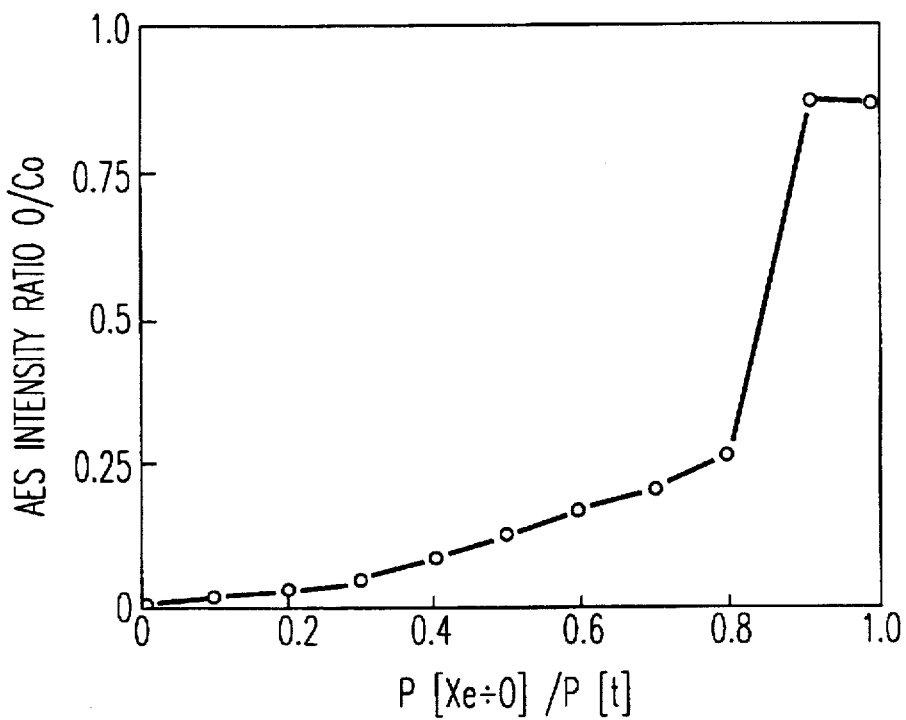
FIG. 24 is a diagram representing the relationship between a sputtering-pressure ratio P[Xe+O]/P[t] and an AES strength ratio O/Co, with respect to the CoPt film formed in Example 11 of the invention.

FIG. 24 is a graph illustrating the relationship between P[Xe+O]/P[t] and Auger electron spectral intensity ratio O/Co between oxygen and Co atom obtained in AES analysis. The Auger electron spectral intensity ratio O/Co was in accordance with an average oxygen concentration in the film. As is clear from this figure, as the P[Xe+O]/P[t] increased, the oxygen concentration increased. For example, when the P[Xe+O]/P[t] was increased from 0.5 to 0.8, the oxygen concentration increased from 0.125 to 0.25.

Figure 25:
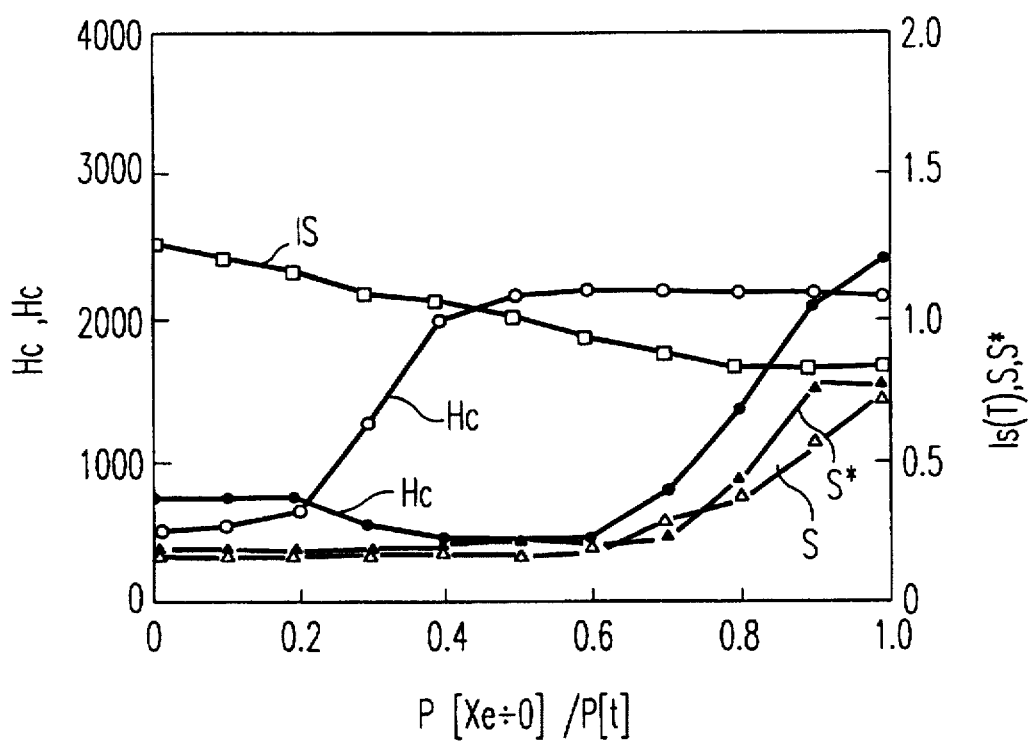
FIG. 25 is a diagram showing the relationship between a sputtering-pressure ratio P[Xe+O]/P[t], and perpendicular coercivity, in-plane coercivity, saturation magnetization Is and squareness S and S*, with respect to the CoPt film formed in Example 11 of the invention, wherein the O/Co ratio in the film remained constant.
Figure 26:
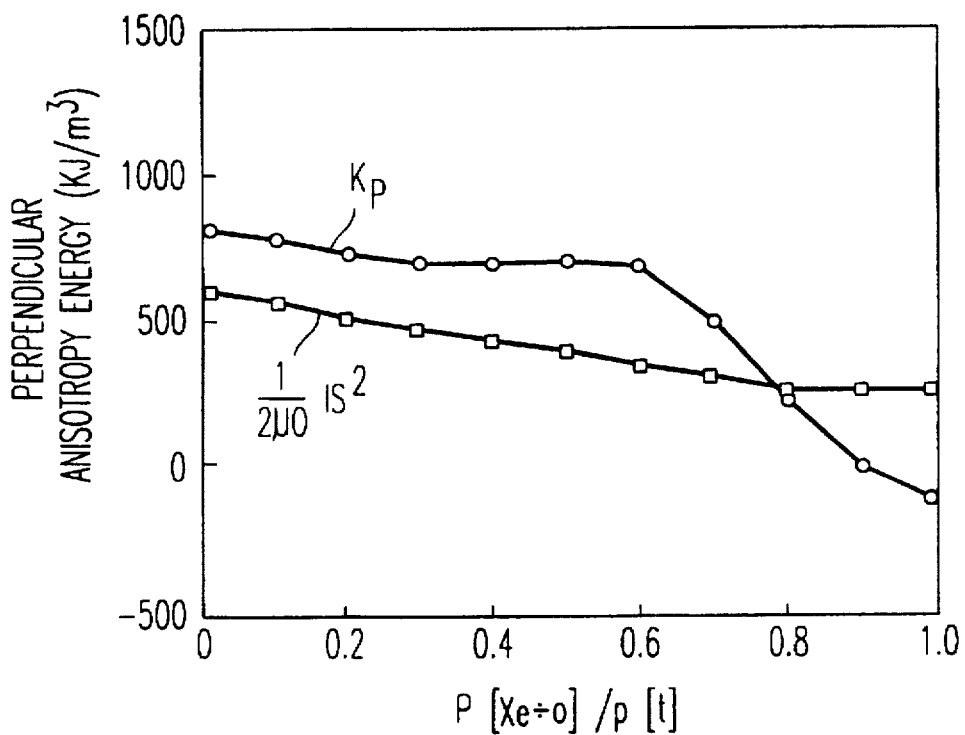
FIG. 26 is a diagram representing the relationship between the sputtering-pressure ratio P[Xe+O]/P[t] and perpendicular-anisotropy energy of the CoPt film formed in Example 11 of the invention, wherein the O/Co ratio in the film remained constant.

Next, a similar operation was conducted by adjusting the oxygen partial pressure of the sputtering gas such that the Auger electron spectral intensity ratio O/Co in the film was about 0.1. FIG. 25 is a graph illustrating the relationship between P[Xe+O]/P[t], magnetic properties of film, i.e. perpendicular coercivity (open circles), in-plane coercivity (filled circles), saturation magnetization Is and squareness ratios S and S*. FIG. 26 is a graph illustrating the relationship between P[Xe+O]/P[t] and perpendicular magnetic anisotropy energy (Kp=Ku$^{ew}$+Is$^2$/2 µ$_o$) measured by the magnetic torque meter. As is clear from these figures, the magnetic properties varied along with a change in composition of sputtering gas, even in the case where the oxygen concentration was substantially constant. For example, when the P[Xe+O]/P[t] was less than 0.2, the perpendicular coercivity was small, whereas when the P[Xe+O]/P[t] was 0.2 or more, the perpendicular coercivity was increased. Further, when the P[Xe+O]/P[t] was 0.6 or more, the in-plane coercivity was increased.

The film of this example was examined in terms of oxygen concentration distribution by EDX using an analytical electron microscope, in this examination, the surface of the film was divided into a lattice of very fine square regions each having a side of a few nanometers, and the oxygen concentration at each region was measured to determine the oxygen concentration distribution. According to the results, the oxygen concentration distribution of the surface of the film had two peaks, except for the case where oxygen-containing Xe gas only or oxygen-containing Ar gas only was used for manufacturing film. The degree of separation of the two peaks in the oxygen concentration distribution was higher (more prominent separation) as the P[Xe+O]/P[t] approached 0.5.

For comparison, CoPt films were manufactured using oxygen-containing Xe gas only or oxygen-containing Ar gas only as sputtering gas. Thus manufactured films had only one peak in its oxygen concentration distribution on surface, indicating that oxygen was substantially uniformly dispersed.

Similar results were obtained when He, Ne or Kr was used in place of Xe or Ar.

Those films of this Example which had two peaks in oxygen concentration distribution were subjected to measurement in terms of reflection X-ray diffraction, and separation of peak was detected along with the peaks of oxygen concentration.

Further, as in the case of Example 8, a soft magnetic film, a non-magnetic film and the perpendicular magnetization film of this example were laminated on the glass substrate, thus manufacturing a perpendicular magnetic recording medium. The above manufactured medium was combined with the head shown in FIG. 6 into a magnetic recording-reproducing apparatus. Using this apparatus, recording-reproducing operations were performed by contact recording to examine recording density characteristics. According to the results, the apparatus of this Example exhibited a high linear recording resolution and low noise as compared to the case where convention medium was used. In other examinations conducted in similar to those of the Example 8, similar results were obtained.

Figure 27:
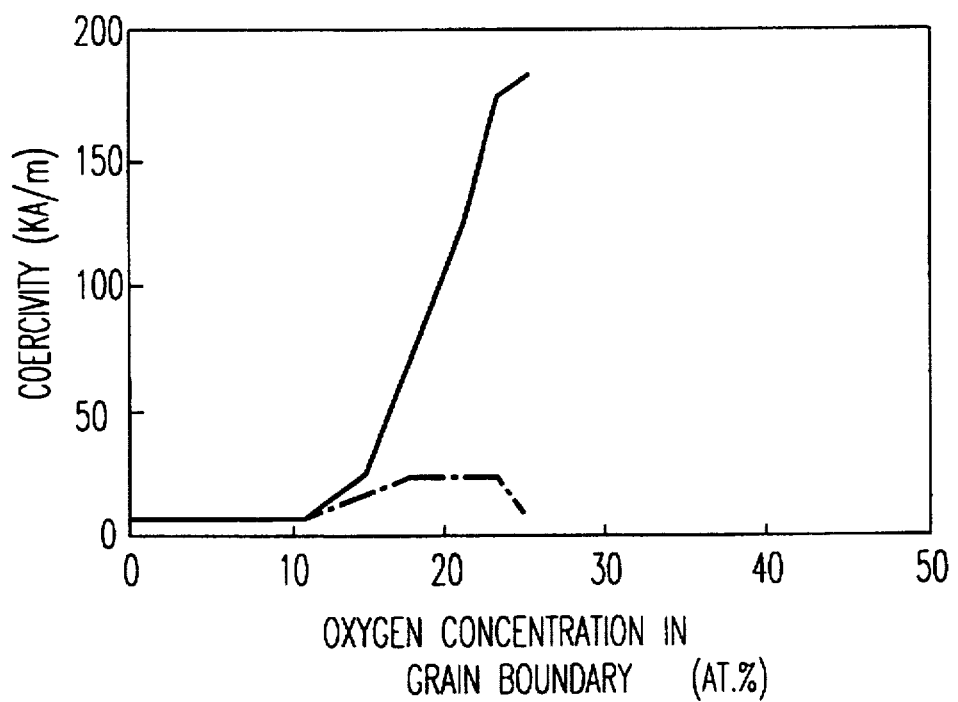
FIG. 27 is a diagram depicting the relationship between the oxygen concentration at grain boundaries and coercivity, with respect to the CoPt film formed in Example 11 of the invention.
Figure 28:
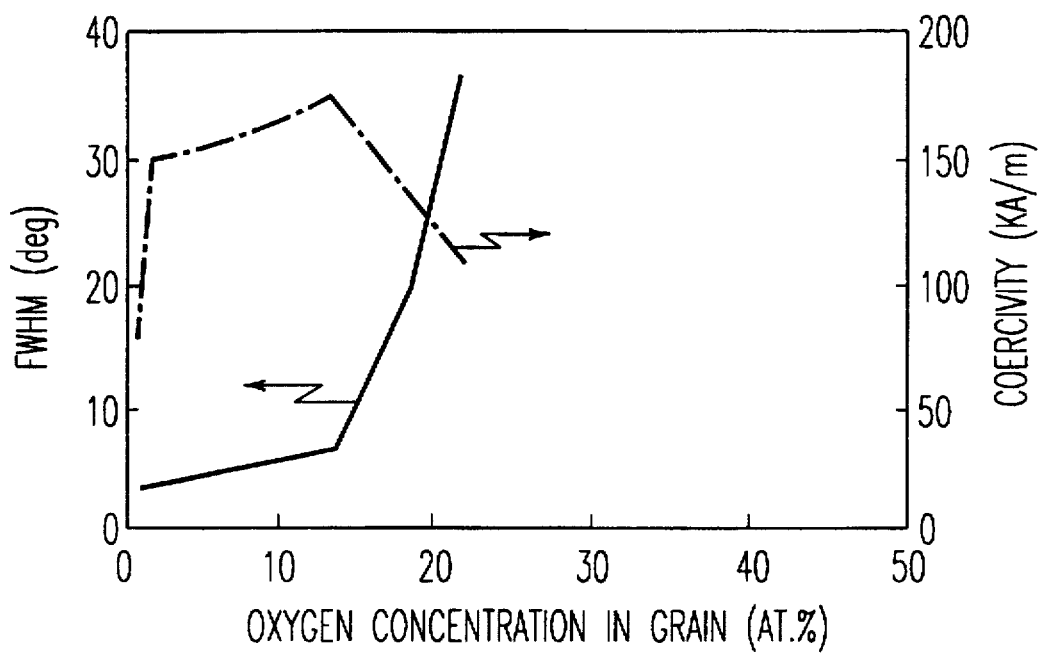
FIG. 28 is a diagram illustrating the relationship between the oxygen concentration in grains, and coercivity and FWHM of c-axis, with respect to the CoPt film formed in Example 11 of the invention.

Next, the relationship between oxygen concentration within film and magnetic properties of the film was examined in detail by the EDX analysis. FIGS. 27 and 28 are graphs illustrating the results of the examination. FIG. 27 illustrates the relationship between the oxygen concentration and coercivity in grain boundary, and FIG. 28 illustrates the relationship between the oxygen concentration in grains, coercivity and half-value width of c-axis.

As is clear from FIG. 27, when the oxygen concentration in grain boundary was less than 15 atomic %, the coercivity was as low as 30 kA/m at maximum. Further, as is clear from FIG. 28, when the oxygen concentration in grain boundary exceeded 15 atomic %, the crystal orientation was greatly decreased, and the perpendicular magnetic anisotropy was liable to decrease. On the other hand, when the oxygen concentration in grain boundary was less than 1 atomic %, the film exhibited less multilayer defect in the region of one grain, and a small coercive film. Therefore, the oxygen concentration is preferably 15 atomic % in grain boundaries, and 1 to 15 atomic % within a grain.

It should be noted that CoPt binary alloy was used in this example, but the alloy used is not limited to the type containing Pt as long as oxygen bonds to Co, and may be a type containing Pd, Ni, Cr, Sm or the like, which has a large magnetic anisotropy, in amount of 40 atomic % or less. Further, at least one of the elements selected from the group consisting of Mo, W, Fe, Ti, Cr, Nb, Zr and Hf, may be added to such a type of alloy in amount of 20 atomic % or less, for the purpose of reducing crystal grain size. However, in consideration of magnetic anisotropy, the amount of addition of these elements is preferably 10 atomic % or less. Furthermore, at least one of the elements selected from the group consisting of Si, V, C, B and P, may be added to such a type of alloy in amount of 10 atomic % or less, for the purpose of varying the ratio of oxygen bonding to Co, to oxygen bonding to all metal elements. However, in consideration of corrosion, the amount of addition of these elements is preferably 5 atomic % or less.

Example 12

A soft magnetic film, and a non-magnetic film made of a PtPd alloy were formed in this order on a glass plate, which was chemically reinforced, serving as a substrate. Then, a CoPt film was formed by the DC magnetron sputtering as in the following manner. Thus obtained substrate and a Co alloy plate having a size of 5 inches and a Pt content of 20%, serving as a target, were placed in a DC magnetron sputtering chamber with an interval between the substrate and target set to 120 mm, sputtering was performed under the conditions in which the temperature of the substrate was decreased to 5° C. or less by cooling the rear surface of the substrate holder with liquid nitrogen, the sputtering total pressure was set at 4 Pa, and the sputtering electrical power per 5 inch size was 1 kW, thereby manufacturing a CoPt film. During the sputtering operation, two types of gas, i.e. Xe gas having an oxygen content of 0.01% and Ar gas having an oxygen content of 0.01%, were used, and the ratio of both types of gas was set to 1:1.

Oxygen mixed into the film was measured by X-ray photoelectron spectroscopy (XPS), and the oxygen concentration was 30 atomic %. Of all oxygen, the ratio of oxygen bonding by adsorption was 60%, that of oxygen bonding to metal element was 20%, and that of oxygen bonding to form a hydroxide group was 20%.

Films of the above type were heat-treated in a vacuum state, with various time periods, from 1 to 120 minutes and various temperatures in a range of 500 to 300° C., thereby manufacturing films having different ratios of oxygen bonding by adsorption to total oxygen amount. For a low substrate temperature, total oxygen amount was liable to decrease. On the other hand, when the substrate temperature was high, the total oxygen amount did not decrease, but only the amount of adsorbed oxygen was liable to decrease.

Figure 29:
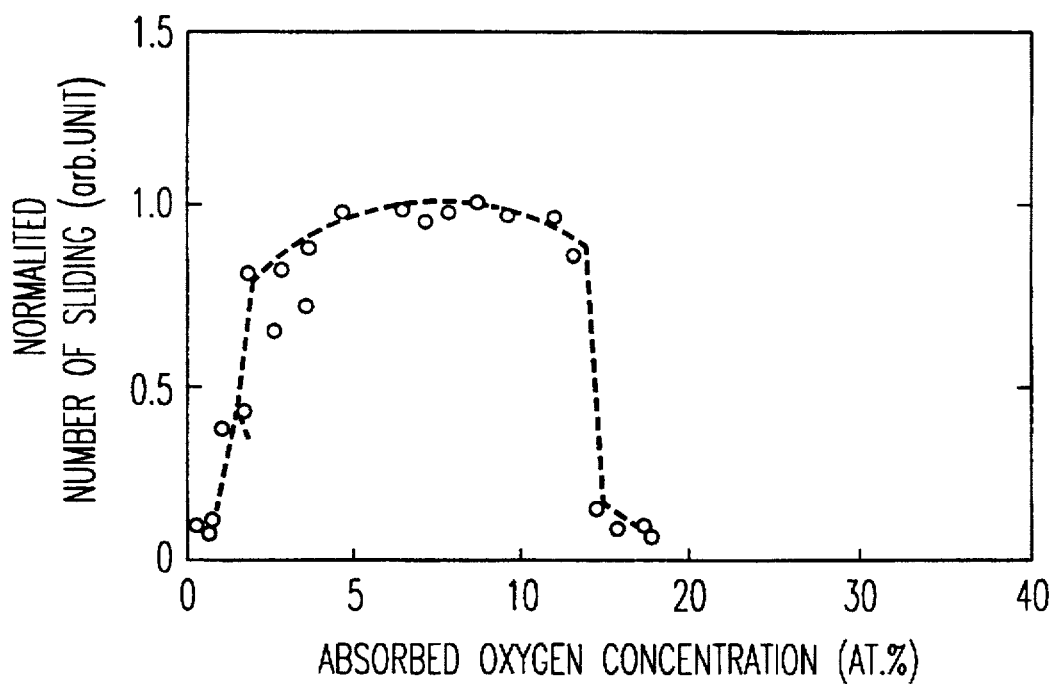
FIG. 29 is a diagram demonstrating the relationship between the adsorbed oxygen concentration and the normalized number of sliding, with respect to a CoPt film formed in Example 12 of the invention.

These films were subjected to slide test by pin-on-disk technique, using a sapphire pin. In this test, the number of times of slide before generation of scratch or crack, was counted. FIG. 29 is a graph illustrating the relationship between concentration of adsorbed oxygen and the number of times of slide. The number of times of slide plotted in FIG. 29 was expressed in relative value with respect to the best result taken as 1.0. It was found from the results of the test that those films which had an amount of adsorbed oxygen of less than 1 atomic % exhibited insufficient film hardness, and the surfaces of such films were depressed. In contrast, when the amount of adsorbed oxygen exceeded 15 atomic %, such films exhibited sufficient film hardness, but, at the same time, strong internal compression force. As a result, these films were easily cracked. Those films which had an amount of adsorbed oxygen of 1 to 15 atomic % exhibited good slide characteristics.

The films of this example were subjected to EDX analysis, and it was detected that the oxygen concentration distribution of each film had two separated peaks. Further, the films were subjected to electron energy-loss spectroscopy (EELS), and it was found that those films in which oxygen in grains bonded mainly by adsorption, and oxygen in grain boundaries bonded to Co, exhibited excellent properties, particularly in perpendicular magnetic anisotropy energy and slide characteristics. It should be noted that even nitrogen was contained in addition to oxygen, similar results were obtained.

What is claimed is:

1. A longitudinal recording medium comprising:
   a substrate; and
   a longitudinal magnetization film formed on the substrate, containing grains of a CoPt-based alloy, and exhibiting an oxygen-concentration distribution having two peaks, one pertaining to grain boundaries and being at least 15 atomic %, and the other pertaining to grain interiors and being to 1 to 15 atomic %,
   wherein said longitudinal magnetization film is formed by sputtering a CoPt-based target in a sputtering atmosphere containing oxygen so as to generate two types of sputtered particles, one type having higher energy than the other.

2. The medium according to claim 1, wherein said longitudinal magnetization film is formed by sputtering using two types of sputtering gases.

3. The medium according to claim 1, wherein said longitudinal magnetization film is formed by switching sputtering power repeatedly between high and low values.

4. The medium according to claim 1, wherein said magnetization film is formed by using two sets of target and sputtering gun, the sputtering guns of the two sets being supplied with different powers.

5. A magnetic recording apparatus comprising:
   a longitudinal recording medium comprising a substrate and a longitudinal magnetization film formed on the substrate, containing grains of a CoPt-based alloy, and exhibiting an oxygen-concentration distribution having two peaks, one pertaining to grain boundaries and being at least 15 atomic %, and the other pertaining to grain interiors and being 1 to 15 atomic %;
   a recording head for magnetizing the film, thereby recording signals on the recording medium; and
   a reproducing head comprising a magnetoresistance element for reading signals from the recording medium,
   wherein said longitudinal magnetization film is formed by sputtering a CoPt-based target in a sputtering atmosphere containing oxygen so as to generate two types of sputtered particles, one type having higher energy than the other.

6. The apparatus according to claim 5, wherein said longitudinal magnetization film is formed using two types of sputtering gases.

7. The medium according to claim 5, wherein said longitudinal magnetization film is formed by switching sputtering power repeatedly between high and low values.

8. The medium according to claim 5, wherein said magnetization film is formed by using two sets of target and sputtering gun, the sputtering guns of the two sets being supplied with different powers.

9. A magnetic recording apparatus comprising:
   a longitudinal recording medium comprising a substrate, an underlayer formed on the substrate, and a longitudinal magnetization film formed on the underlayer, containing grains of a CoPt-based alloy, and exhibiting an oxygen-concentration distribution having two peaks, one pertaining to grain boundaries and being at least 15 atomic %, and the other pertaining to grain interiors and being 1 to 15 atomic %;

a recording head for magnetizing the film, thereby recording signals on the recording medium; and a reproducing head comprising a magnetoresistance element for reading signals from the recording medium, wherein said longitudinal magnetization film is formed by sputtering a CoPt-based target in a sputtering atmosphere containing oxygen so as to generate two types of sputtered particles, one type having higher energy than the other.

10. The apparatus according to claim 9, wherein said longitudinal magnetization film is formed by sputtering using two types of sputtering gases.

11. The medium according to claim 9, wherein said longitudinal magnetization film is formed by switching sputtering power repeatedly between high and low values.

12. The medium according to claim 9, wherein said magnetization film is formed by sputtering using two sets of target and sputtering gun, the sputtering guns of the two sets being supplied with different powers.

* * * * *